(12) United States Patent
Lerick et al.

(10) Patent No.: US 9,536,231 B2
(45) Date of Patent: Jan. 3, 2017

(54) MANAGING BUILDING INFORMATION AND RESOLVING BUILDING ISSUES

(71) Applicant: WWTemplar LLC, Wilmington, DE (US)

(72) Inventors: Thomas Lerick, Savage, MN (US); Ronak Desai, Daytona, FL (US); Michael Kramer, Princeton, MN (US); Joseph Schmitt, Whitefish, MT (US)

(73) Assignee: WWTemplar LLC, Wilmington, DE (US)

( * ) Notice: Subject to any disclaimer, the term of this patent is extended or adjusted under 35 U.S.C. 154(b) by 0 days.

(21) Appl. No.: 14/925,358

(22) Filed: Oct. 28, 2015

(65) Prior Publication Data

US 2016/0117646 A1 Apr. 28, 2016

Related U.S. Application Data

(60) Provisional application No. 62/206,265, filed on Aug. 17, 2015, provisional application No. 62/172,697, (Continued)

(51) Int. Cl.
*G06Q 10/00* (2012.01)
*G06Q 10/10* (2012.01)
(Continued)

(52) U.S. Cl.
CPC ........ *G06Q 10/1097* (2013.01); *G06Q 10/067* (2013.01); *G06Q 10/20* (2013.01); *G06Q 50/163* (2013.01)

(58) Field of Classification Search
CPC ........... G06Q 10/00–50/00; G06F 1/00–21/00; G05B 1/00–24/00
(Continued)

(56) References Cited

U.S. PATENT DOCUMENTS 6,006,016 A * 12/1999 Faigon ................ G06F 11/2252
714/26
6,691,064 B2 * 2/2004 Vroman .............. B61L 27/0094
702/113

(Continued)

OTHER PUBLICATIONS

Actsoft, "Solutions for Today's Mobile Resources" Aug. 2012 available at http://www.actsoft.com/wp-content/ uploads/2012/08/Actsoft-Corporate-2012_v2. pdf.*

(Continued)

*Primary Examiner* — Alan S Miller
(74) *Attorney, Agent, or Firm* — Fish & Richardson P.C.

(57) ABSTRACT

In one implementation, a computer-implemented method includes receiving information that describes an issue with a building; accessing data that identifies (i) a plurality of components that are included in the building and (ii) features of the plurality of components; identifying one or more candidate components that have at least a threshold likelihood of being a cause of the issue; selecting a candidate service provider from among a plurality of service providers based on a comparison of (i) the one or more candidate components and (ii) information identifying technical qualifications for the plurality of service providers; transmitting a service request for the issue to the candidate service provider; receiving a response from the candidate service provider; and scheduling, based on the response, a service appointment with the candidate service provider to resolve the issue.

20 Claims, 19 Drawing Sheets

Related U.S. Application Data filed on Jun. 8, 2015, provisional application No. 62/115,088, filed on Feb. 11, 2015, provisional application No. 62/069,559, filed on Oct. 28, 2014.

(51) Int. Cl.
*G06Q 50/16* (2012.01)
*G06Q 10/06* (2012.01)

(58) Field of Classification Search
USPC .............................................. 705/7.11–7.42
See application file for complete search history.

(56) References Cited

U.S. PATENT DOCUMENTS

| | | | | |
|---|---|---|---|---|
| 6,728,660 | B2* | 4/2004 | Bjornson | G05B 23/0278 |
| | | | | 702/185 |
| 6,763,148 | B1* | 7/2004 | Sternberg | G06F 17/30247 |
| | | | | 382/293 |
| 6,947,797 | B2* | 9/2005 | Dean | B61C 17/04 |
| | | | | 700/110 |
| 7,209,817 | B2* | 4/2007 | Abdel-Malek | B61L 27/0094 |
| | | | | 340/988 |
| 7,340,649 | B2* | 3/2008 | Angamuthu | G06F 11/0727 |
| | | | | 709/220 |
| 8,577,131 | B1* | 11/2013 | Li | G06K 9/6256 |
| | | | | 382/157 |
| 2002/0095269 | A1* | 7/2002 | Natalini | H04L 12/2803 |
| | | | | 702/188 |
| 2002/0116202 | A1* | 8/2002 | Bantz | G06Q 10/063 |
| | | | | 705/333 |
| 2002/0128728 | A1* | 9/2002 | Murakami | G05B 23/0245 |
| | | | | 700/10 |
| 2002/0130784 | A1* | 9/2002 | Suzuki | G05B 15/02 |
| | | | | 340/635 |
| 2006/0069578 | A1* | 3/2006 | Borkowski | G06Q 10/20 |
| | | | | 705/1.1 |
| 2008/0114874 | A1* | 5/2008 | Meir | H04L 12/66 |
| | | | | 709/224 |
| 2008/0183704 | A1* | 7/2008 | Miller | G06N 5/04 |
| 2009/0089209 | A1* | 4/2009 | Bixler | G06Q 20/102 |
| | | | | 705/40 |
| 2009/0327024 | A1* | 12/2009 | Nielsen | G06Q 10/06398 |
| | | | | 705/7.42 |
| 2010/0312604 | A1* | 12/2010 | Mitchell | G06Q 10/06 |
| | | | | 705/7.13 |
| 2013/0201018 | A1* | 8/2013 | Horstemeyer | G07C 5/006 |
| | | | | 340/539.14 |
| 2014/0244329 | A1* | 8/2014 | Urban | G06Q 10/06311 |
| | | | | 705/7.15 |
| 2014/0267776 | A1* | 9/2014 | Duthu | G06Q 10/087 |
| | | | | 348/169 |
| 2016/0117646 | A1* | 4/2016 | Lerick | G06Q 10/067 |
| | | | | 705/7.21 |

OTHER PUBLICATIONS

ClickSoftware, "Field Service Management, Employee Location Tracking, Xora" 2016 available at http://smart.clicksoftware.com/products/overview/products-features/.*
International Search Report and Written Opinion for PCT/US2015/057819, mailed Jan. 11, 2016, 15 pages.
"Secure Online Scheduling for Appliance Repair & Maintenance," CenterPoint Energy, publically available before Oct. 28, 2015 [retrieved on Jan. 4, 2016]. Retrieved from the Internet: URL<http://www.centerpointenergy.com/en-us/residential/services/home-service-plus/schedule-service>, 3 pages.
Duryee, "Amazon plans local services marketplace launch, challenging Yelp, Angie's List," GeekWire, Jun. 10, 2014 [retrieved on Jan. 4, 2016]. Retrieved from the Internet: URL<http://www.geekwire.com/2014/amazon-plans-local-services-marketplace-launch-challenging-yelp-angies-list/>, 8 pages.
Jarvis et al., "Outsourcing Your Errands: TaskRabbit Allows People to Rent Themselves Out for Odd Jobs," ABC News, Jun. 20, 2014 [retrieved on Jan. 4, 2016]. Retrieved from the Internet: URL<http://abcnews.go.com/Business/outsourcing-errands-taskrabbit-people-rent-odd-jobs/story?id=24231980>, 5 pages.
Mastin, "Scheduling Services Showdown: Schedulicity vs. Genbook vs. Appointy," PCWorld, publically available before Oct. 28, 2015 [retrieved on Jan. 4, 2016]. Retrieved from the Internet: URL<http://www.pcworld.com/article/250227/scheduling_services_showdown.html>, 11 pages.
Miles, "6 On-Demand Home Service Marketplaces," Street Fight Mag, Oct. 29, 2013 [retrieved on Jan. 4, 2016]. Retrieved from the Internet: URL<http://streetfightmag.com/2013/10/29/6-on-demand-home-service-marketplaces/>, 7 pages.
Newton, "TaskRabbit is blowing up its business model and becoming the Uber for everything," The Verge, Jun. 17, 2014 [retrieved on Jan. 4, 2016]. Retrieved from the Internet: URL<http://www.theverge.com/2014/6/17/5816254/taskrabbit-blows-up-its-auction-house-to-offer-services-on-demand>, 5 pages.
Tam, "Order a plumber like you would an Uber car with ClubLocal," CNET, Jun. 6, 2013 [retrieved on Jan. 4, 2016]. Retrieved from the Internet: URL<http://www.cnet.com/news/order-a-plumber-like-you-would-an-uber-car-with-clublocal/>, 3 pages.
White, "Angie's List app makes finding service a snap," Angie's List, Mar. 10, 2014 [retrieved on Jan. 4, 2016]. Retrieved from the Internet: URL<http://www.angieslist.com/articles/angie-s-list-app-makes-finding-service-snap.htm>, 5 pages.

* cited by examiner

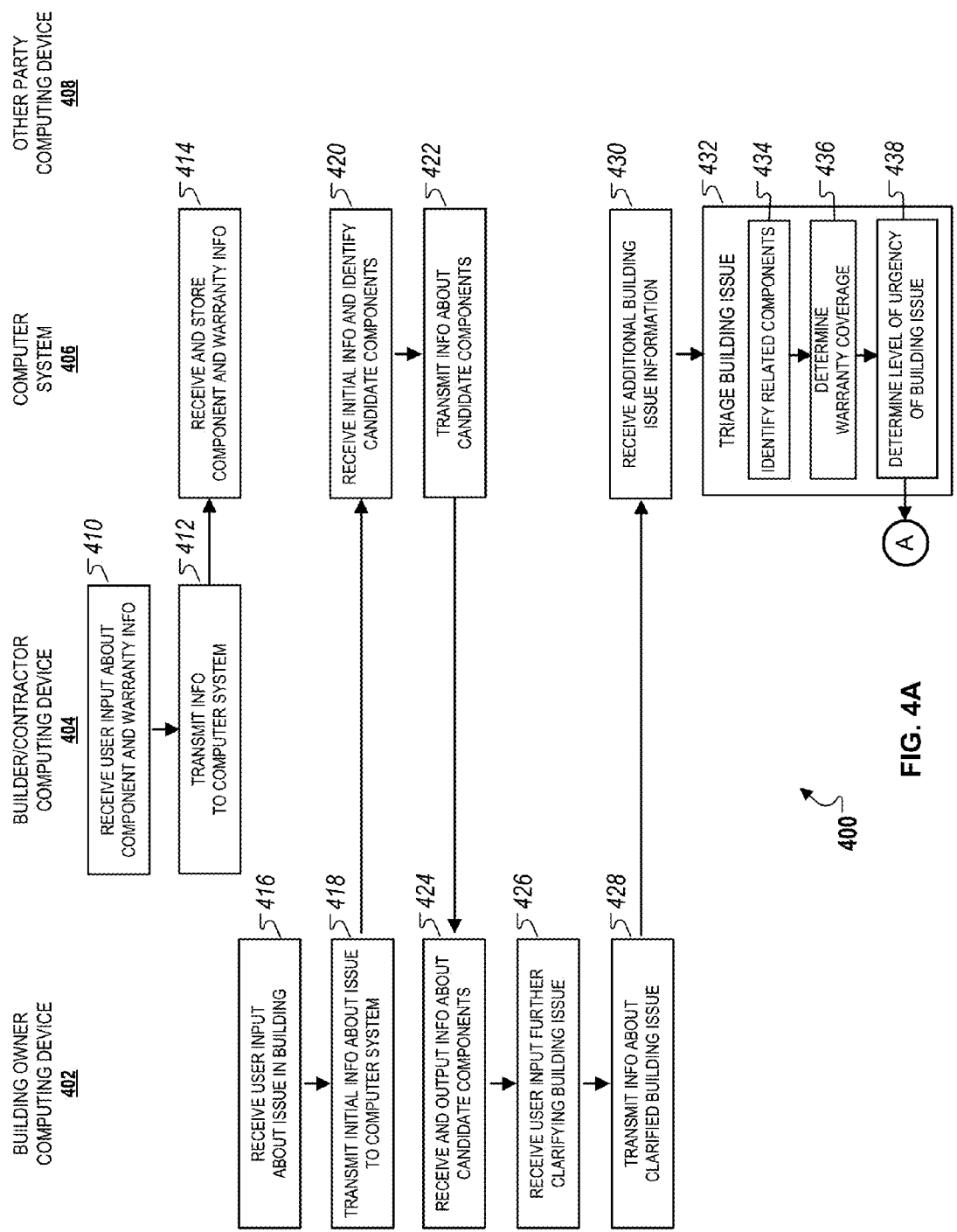

MANAGING BUILDING INFORMATION AND RESOLVING BUILDING ISSUES

CROSS-REFERENCE TO RELATED APPLICATIONS

This application claims the benefit of priority to U.S. Provisional Application Ser. No. 62/069,559, which is entitled "MANAGING BUILDING INFORMATION AND RESOLVING BUILDING ISSUES" and has a filing date of Oct. 28, 2014; to U.S. Provisional Application Ser. No. 62/115,088, which is entitled "MANAGING BUILDING INFORMATION AND RESOLVING BUILDING ISSUES" and has a filing date of Feb. 11, 2015; to U.S. Provisional Application Ser. No. 62/172,697, which is entitled "MANAGING BUILDING INFORMATION AND RESOLVING BUILDING ISSUES" and has a filing date of Jun. 8, 2015; and to U.S. Provisional Application Ser. No. 62/206,265, which is entitled "MANAGING BUILDING INFORMATION AND RESOLVING BUILDING ISSUES" and has a filing date of Aug. 17, 2015. The entire contents of these applications are incorporated herein by reference.

TECHNICAL FIELD

This document generally describes computer-based technology related to managing building information and resolving building issues.

BACKGROUND

Users have traditionally called service technicians to fix issues within their buildings (e.g., house, apartment, office). For example, a user who notices that a component (e.g., sprinkler head) of a fire suppression system is leaking may call a service technician to come out to resolve the issue, which may involve replacing the leaky sprinkler head. With regard to such issues, users have been responsible to manage warranties for various components that are included in buildings, such as warranties covering materials (e.g., shingles, flooring materials), fixtures (e.g., lighting fixtures, plumbing fixtures), and appliances (e.g., washer, dryer, refrigerator).

SUMMARY

This document generally describes computer-based technology related to managing building information and associated warranties, triaging building issues, and facilitating appropriate responses to such building issues. For example, this document describes computer systems that can obtain and manage information related to the components that are installed in a building, such as information identifying the particular components that are installed, the dates on which they were installed and/or serviced, and their associated warranties and warranty periods. Such computer systems can additionally assist users in triaging and resolving issues that may arise with a building, such as light switches not working properly and/or fire suppression systems (e.g., sprinkler systems) malfunctioning. For instance, users can be guided through a process to identify specific components and systems within a building that are malfunctioning, to determine whether the issue is currently under warranty, and/or to determine a level of urgency for resolving the problem. Such a process can additionally include identifying service technicians qualified to resolve the issues with the appropriate components within an acceptable timeframe based on the level of urgency.

In one implementation, a computer-implemented method includes receiving, at a computer system and from a client computing device, information that describes an issue with a building, the information including first information corresponding to the issue and second information identifying the building or a user associated with the building; accessing, by the computer system and based on the second information identifying the building or the user associated with the building, data that identifies (i) a plurality of components that are included in the building and (ii) features of the plurality of components; identifying, by the computer system and based on a comparison of the first information with the data for the building, one or more candidate components that have at least a threshold likelihood of being, at least partially, a cause of the issue; selecting, by the computer system, a candidate service provider from among a plurality of service providers based on a comparison of (i) the one or more candidate components and (ii) information identifying technical qualifications for the plurality of service providers; transmitting, by the computer system, a service request for the issue to the candidate service provider; receiving, at the computer system, a response from the candidate service provider; and scheduling, by the computer system and based on the response, a service appointment with the candidate service provider to resolve the issue.

Such a method can optionally include one or more of the following features. The service request can include information identifying the one or more candidate components, and the response from the candidate service provider can indicate that the one or more candidate components are currently accessible to the candidate service provider for the service appointment. The service request can include information identifying a timeframe for resolving the issue, and the response from the candidate service provider can indicate that the candidate service provider is currently able to resolve the issue within the timeframe. The computer-implemented method can further include determining a level of urgency of the issue based on the information received from the client computing device; and determining the timeframe based, at least in part, on the level of urgency.

The candidate service provider can be selected based, at least in part, on the candidate service provider either providing a warranty associated with the one or more candidate components or being preapproved by a warranty provider for the one or more candidate components to service the issue. The candidate service provider can be selected using a bidding process for the service request involving a plurality of candidate service providers, and the candidate service provider can be selected based, at least in part, on a particular bid that was provided by the candidate service provider for the bidding process. The bid provided by the candidate service provider can have provided a lowest price for servicing the issue from among all bids received in the bidding process. The bid provided by the candidate service provider can have provided a shortest guaranteed timeframe for servicing the issue from among all bids received in the bidding process. The bid provided by the candidate service provider can have provided a fastest guaranteed response time for servicing the issue from among all bids received in the bidding process.

The information that describes the issue with the building can be one or more photographs taken of the issue by the client computing device. The computer-implemented method can further include transmitting component information that describes the one or more candidate components to the client computing device; and receiving, from the client computing device, selection of one or more of the candidate components as being a likely cause of the issue. The component information can be images of the one or more components. The component information can be textual descriptions of where in the building the one or more components are installed. The computer-implemented method can further include determining whether the one or more candidate components are covered under one or more warranties; and transmitting information about the one or more warranties to the client computing device. The computer-implemented method can further include processing payment for work performed at the service appointment based, at least in party, on the one or more warranties for the one or more candidate components.

The computer-implemented method can further include receiving information from the candidate service provider indicating that the issue with the building has been resolved; transmitting, to the client computing device, a request for confirmation that the issue has been resolved; and receiving, from the client computing device, confirmation that the issue has been resolved. The computer-implemented method can further include, in response to receiving the conformation from the client computing device, processing payment of one or more invoices from the candidate service provider for work performed at the service appointment.

Other embodiments of these aspects include corresponding apparatus and computer programs recorded on one or more computer storage devices, configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The details of one or more implementations are depicted in the associated drawings and the description thereof below. Certain implementations may provide one or more advantages. For example, the disclosed technology can help solve the technical problem of accurately diagnosing electrical and mechanical issues that arise within a building, especially when observed by a lay person. By storing and using comprehensive information regarding the components and systems that are included within a building, users (including non-expert users, such as homeowners) can accurately evaluate an issue, identify specific systems and components that are implicated as part of the issue, and determine the source of the issue, the severity of the issue, and best steps for resolving the issue.

For example, a homeowner may not know details about the components of their fire suppression system, such as sprinkler heads, shutoff valves, and control panels, let alone how to determine whether an issue (e.g., a water leak) in their house is being caused by the fire suppression system or other water systems within the home. The disclosed technology can help such a homeowner, who may be a lay person, successfully and accurately triage such issues. For instance, a homeowner who finds a pool of water on the floor can use the disclosed technology to accurately triage the system (e.g., fire suppression system) and specific installed component (e.g., sprinkler head) that is causing the issue (e.g., water on the floor), all without the homeowner needing special knowledge about the systems or components within their home.

Such improved accuracy in triaging building issues can carry over advantages to service providers and others (e.g., insurers, warranty providers, component/system manufacturers) by providing a more accurate and detailed initial report of the issue, the cause of the issue, and the specific components installed. For example, the disclosed technology can allow a user to, themselves, identify specific components (e.g., make, model, serial number) that may be malfunctioning and in need of repair or replacement before a service technician has even received the service request. Such information can help ensure that the service technician shows up at the user's building with the proper tools and equipment to perform the needed service, as well as having an appropriate level of skill to perform the work and a sufficient amount of time blocked off to perform the service request. Such accurate information up-front can reduce the overall cost of processing service requests, which can benefit insurers, warranty providers, and component/system manufacturers who may be paying for the resolution of the service request. Additionally, the accuracy of such information can assist in the efficient resolution of the building issue, which can in turn reduce the amount of damage that may be caused by the building issue and the overall cost to repair the damage.

In another example, the safety of users can be increased by helping users to determine the technical problem of whether a building issue is potentially dangerous to the health and well-being of users who may be located within or near the building. For example, it can often be difficult for users to determine whether an issue within a building is potentially dangerous. The disclosed technology can assist users in accurately triaging building issues and can provide guidance as to appropriate steps to minimize any exposed danger, such as leaving the building immediately, not turning any electrical switches on or off, and/or turning off the valve for the water main.

In a further example, the disclosed technology can assist users in tracking and monitoring warranty information for systems and components that are installed in a building. For instance, a new home will often include multitudes of individual components that may each have one or more warranties, such as warranties from manufacturers, installers, and general contractors/builders. Monitoring and tracking the periods and conditions for each of these warranties can be difficult. The disclosed technology can assist users in more accurately and easily monitoring building warranties, renewing building warranties prior to expiration, and submitting/processing warranty claims.

Other features, objects, and advantages of the technology described in this document will be apparent from the description and the drawings, and from the claims.

BRIEF DESCRIPTION OF THE DRAWINGS

FIGS. 4A-B is a flowchart of an example technique for triaging and resolving issues in a building through a service request.

Like reference symbols in the various drawings indicate like elements.

DETAILED DESCRIPTION

Figure 1:
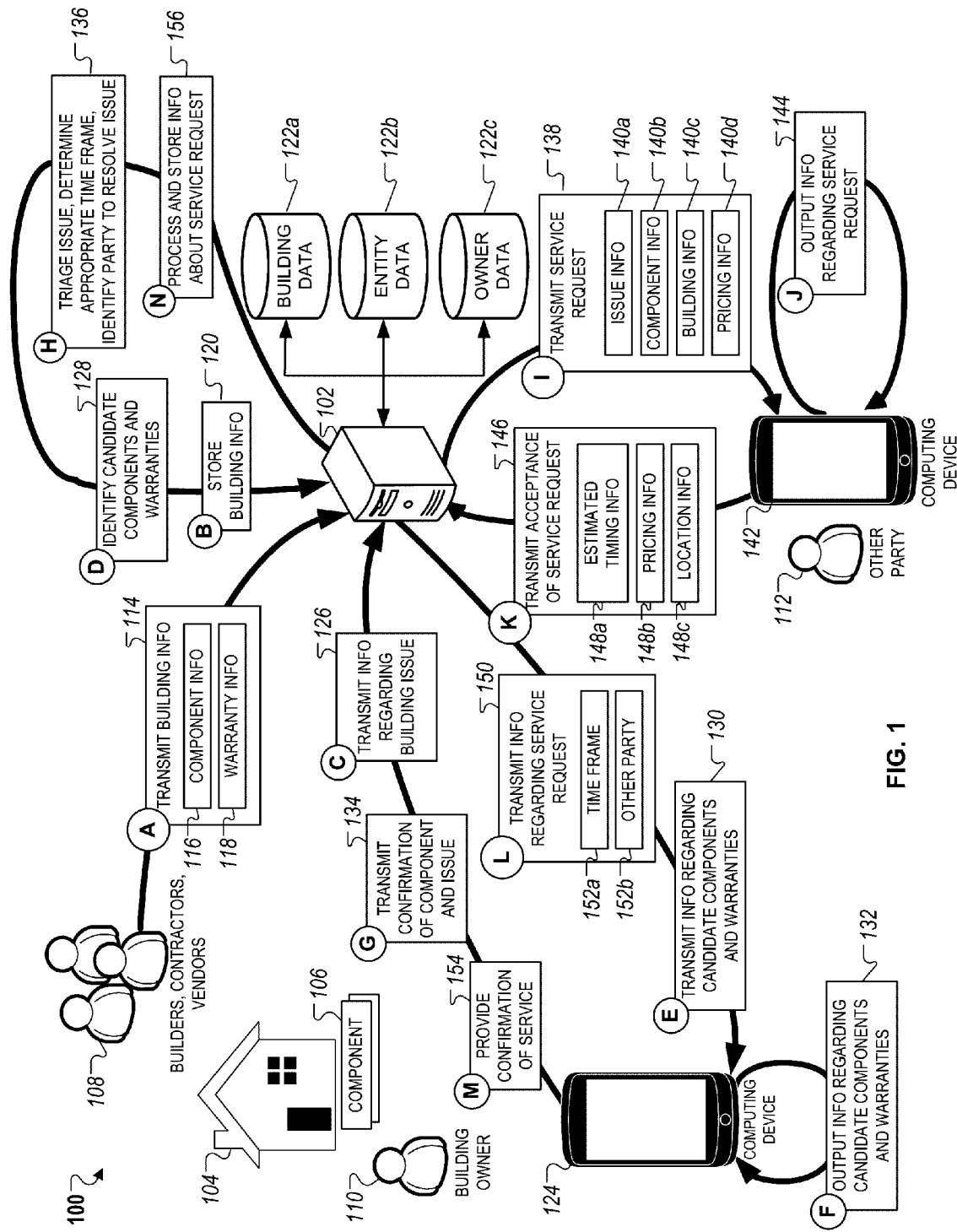
FIG. 1 is a conceptual diagram of an example system for managing building information and associated warranties, triaging building issues, and/or facilitating appropriate responses to such building issues.

FIG. 1 is a conceptual diagram of an example system 100 for managing building information and associated warranties, triaging building issues, and/or facilitating appropriate responses to such building issues. The example system 100 includes a computer system 102 that stores and uses information about buildings, such as the example building 104 (e.g., house, condo building/unit, apartment building/unit, office, garage, recreational facility), to assist users with issues related to buildings and components included therein, such as the components 106 (e.g., systems within the building (e.g., fire suppression system, water system, HVAC system, electrical system) and/or subparts of such systems (e.g., fixtures, pipes, countertops, walling material, insulation, cabinets, appliances)). The computer system 102 can obtain such information from builders, contractors, and/or vendors 108 who have installed, replaced, and/or repaired the components 106 within the building 104, and can use the information to help a building owner 110 to manage the building 104, such as through managing warranties of all of the components 106 and triaging issues that may come up within the building 104, such as one or more of the components 106 malfunctioning. The computer system 102 can additionally interface with one or more other parties 112 (e.g., builders, contractors, vendors, service technicians, component manufacturers/warranty providers, insurers) to facilitate appropriate resolution of issues that may arise in the building 104.

For example, the building 104 can be a home that was built by a general contractor and a multitude of subcontractors (e.g., builders, contractors, and vendors 108) and the building owner 110 can be the homeowner (or other person/entity associated with a building, such as a renter, a tenant, a property management company). Given the multitude of components 106 in the building 104 and the multitude of associated warranties, such as warranties from manufacturers, resellers, and/or contractors, it can be difficult for the homeowner to keep track of all this information for the building 104 and components 106. The computer system 102 can simplify the process for the homeowner by providing interfaces through which the builders, contractors, and vendors 108 can provide information about the building 104 and its components 106 to the computer system 102, which can manage the information. The computer system 102 can then provide the homeowner with access to the information, such as to allow the homeowner to view information about specific components that are installed in the building 104. For example, the homeowner can remotely look-up appliance and fixture information for the building 104. Additionally, the computer system 102 can use the information about the building 104 to assist the homeowner in accurately triaging issues (e.g., water leaks, appliances and/or fixtures not functioning properly) that arise in the home, based on the specific components 106 that have been installed in the building 104.

For instance, it can often be difficult for a lay person to accurately identify a type of component within their home (e.g., determining whether a valve is for the gas line or the water line), let alone to identify more specific information about the components, such as the specific make and model of the component, the age of the component, average life of the component, ways in which the component may malfunction (e.g., a range of problems that may occur with the component), common ways in which the component will malfunction (e.g., particular parts that are likely to wear out before other parts of the components), symptoms that indicate different types of malfunctioning of the component, warranties associated with the component, and/or appropriate service technicians to fix the component. The computer system 102 can use the specific information about the components 106 that are installed in the building 104 to assist the homeowner in accurately identifying the source of a problem (e.g., a water leak) in the building 104, the specific components that are likely the cause of the problem, likely resolutions of the problem (e.g., replacing or repairing the specific components), the level of danger and/or severity of the problem, whether the problem is currently covered under one or more warranties, and appropriate entities (e.g., service technicians, warranty providers) to contact to resolve the problem.

As indicated by step A (114), the builders, contractors, and/or vendors 108 can transmit, using computing devices (e.g., desktop computer, tablet computing device, smartphone, laptop, wearable computing device) that are not depicted, information about the building 104 to the computer system 102. The computer system 102 can provide one or more interfaces through which the builders, contractors, and/or vendors 108 can transmit the information, such as webpages and/or mobile applications. The interfaces can include any of a variety of features that can help facilitate entering and transmitting the information, such as importing information from bills of materials, optically scanning barcodes of components, using near field communication (NFC) devices (e.g., RFID tags) to obtain information about the components, and/or other data sources and/or devices that can reduce manual entry of the information. The information that is transmitted to the computer system 102 can include component information 116 and warranty information 118. The component information 116 can include information that identifies the components 106, such as make and model information, serial numbers, other unique identifiers (e.g., barcodes) for the components 106, and/or information about how and/or by whom the component was installed/serviced/repaired. The warranty information 118 can include information that identifies warranties for the components, such as a warranty provider, terms and conditions on the warranty, warranty periods, authorized parties for servicing the warranty, and/or warranty renewal information.

The information 116 and 118 that is transmitted for the example building 104 at step A (114) can be transmitted by one or more parties. For example, subcontractors working under the direction of a general contractor constructing the building 104 can each individually transmit appropriate information for the portion of the building 104 that they have constructed. In another example, such a general contractor may itself submit all of the information for the building 104. Submissions of information may occur over time for the building 104 (e.g., as different stages of construction/installation are completed, as different services/repairs are performed) or all at once (e.g., upon completion of the construction of the building 104).

The computer system 102 (e.g., computer server system, cloud-based computing system, desktop computer, laptop computer, tablet computing device, smartphone) can receive the information 116 and 118 that is transmitted by the builders, contractors, and vendors 108 and, as indicated by step B (120), can store the building information. For example, the computer system 102 can store the information in one or more data repositories 122*a-c* (e.g., databases, file systems), such as a building data repository 122*a*, an entity data repository 122*b*, an owner data repository 122*c*, and/or other appropriate data repositories. The building data repository 122*a* can store information regarding the building 104, such as information about the building 104 (e.g., address, type of building, date of construction, unique identifier for the building), information about the components 106 (e.g., the component information 116, the warranty information 118), and/or other appropriate information. The entity data repository 122*b* can store information about the builders, contractors, and vendors 108, as well as information about the other parties 112, such as contact information for the entity (e.g., name, telephone number, fax number, email address, unique identifier for the entity), information identifying specialties and other ways in which the entities are associated with buildings and their components (e.g., builder, installer, manufacturer, warranty provider, insurer), account information on the computer system 102 for the entities (e.g., username, password), and other appropriate information. The owner data 122*c* can include a variety of information about the owner 110 of the building 104, such as the owner's name and contact information, buildings that the owner is associated with, account information (e.g., username, password), and other appropriate information for the owner 110.

Once stored, the computer system 102 can maintain and manage the component information 116 and the warranty information 118, such as part a subscription service that is offered over a period of time or for perpetuity on behalf of the builders, contractors, and/or vendors 108 who built the building 104 and/or installed/repaired components 106 in the building 104. Such management can include providing the owner 110 with access to information about the building 104, such as component and warranty information. Additionally, the management can include providing the owner 110 with reminders about warranty periods, upcoming warranty expirations, obtaining quotes from one or more warranty providers for extended warranties, and/or facilitating the purchasing and management of extended warranties. Additionally, as described below with regard to steps C-N, the computer system 102 can assist the owner 110 in triaging and resolving issues that may arise with the building 104 and/or its components 106.

Such services can be provided to the owner 110 (and/or the builders, contractors, vendors 108 and/or the other parties 112) on one or more bases, such as through subscriptions to the services provided by the computer system 102. For example, a builder that builds a building (e.g., a new home) may cover the cost of a subscription to the service provided by the computer system 102 for the building 104 for a period of time (e.g., 1 year, 3, years, 5 years, 10 years, 15 years) on the building owner's behalf and after that period of time, the owner may become responsible for the subscription fee. In another example, building owners may sign-up for the service provided by the computer system 102 on their own.

Regarding triaging issues that may arise with the building 104 and/or its components 106, the owner 110 can use his/her computing device 124 (e.g., laptop, tablet computing device, smartphone, wearable computing device) to transmit initial information about an issue in the building 104, as indicated by step C (126). Such issues can include a variety of different things that may be malfunctioning or otherwise problematic with the building 104 and/or the components 106, such as breakage, leaks, items becoming discolored and/or wearing out, and/or appliances not functioning properly.

This initial transmission can be made through one or more interfaces that are presented on the computing device 124, such as through a webpage that is downloaded onto the computing device 124 from the computer system 102, an application (e.g., mobile application) that is installed and running on the computing device 124, and/or one or more communication/messaging features (e.g., telephone call, video conference, text message, chat session) that are provided on the computing device 124.

As indicated by step D (128), the computer system 102 can receive the information describing the issue from the owner 110 and can, based on the information, identify one or more of the components 106 as candidates for being a source of the issue. For example, the owner 110 may indicate that they have noticed a water leak from the ceiling in a particular room in the building 104. The computer system 102 can reference the components 106 that are installed in the building 104 from the building data repository 122*a* to identify possible components and/or systems that may be causing the water leak in the particular room. For instance, the computer system 102 can identify components of water systems within the building 104, such as domestic water systems (e.g., domestic water lines and components, waste water lines and components) and fire suppression systems (e.g., sprinkler systems and components) as candidate components that may be causing the example building issue (water leak).

Such identification can be made by the computer system 102 based on one or more of a variety of appropriate factors, such as the type of issue (e.g., water, electrical, appliance, HVAC, interior, exterior), classifications of the components 106 (e.g., water system component, electrical system component, appliance, HVAC component, interior component, exterior component), information identifying a location within the building 104 where the issue exists (e.g., kitchen, bathroom, garage, basement), locations within the building 104 where the components 106 are located (e.g., particular room(s) where the components 106 are located), and/or process flows/algorithms that may be used to identify candidate components that may be implicated as part of the issue.

Also as part of step D (128), the computer system 102 can additionally identify one or more warranties that are associated with the candidate components. For example, the computer system 102 can identify candidate components and their associated warranties as they apply to the building 104 from the building data 122*a*. For example, in response to the building owner 110 indicating that the building 104 is experiencing water leaks in the kitchen of the building 104, the computer system 102 can identify the kitchen faucet, the refrigerator with built-in ice/water dispenser, a fire suppression system with sprinkler heads in the kitchen, and an adjacent bathroom with a faucet and toilet as candidate components. The computer system 102 can additionally identify current warranty coverage for these components as they are installed in the building 104. For example, the kitchen faucet may be still under a manufacturer's warranty whereas a manufacturer's warranty for the refrigerator may have expired.

As indicated by step E (130), the computer system 102 can then transmit information regarding the identified candidate components and associated warranties to the computing device 124 for the building owner 110. The information that is transmitted to the computing device 124 can include textual, visual, and other information that can help the building owner 110 correctly identify components in the building 104. For example, the information that is transmitted can include images of the candidate components, descriptions of where these components can be found, and marking information for the candidate components that can help verify correct identifications.

As indicated by step F (132), the computing device 124 can output the information regarding the candidate components and associated warranties. For example, the computing device 124 can be a mobile computing device, such as a smartphone or tablet computing device, that is running a mobile application ("mobile app") that can receive the initial user input regarding the building issue (step C—126), transmit the information to the computer system 102, and then in response can receive and output the information regarding the candidate components and warranties. For instance, images and descriptions of the candidate components can be displayed on the computing device 124 and can be selected by the building owner 110.

In some implementations, the computer system 102 can transmit information to the computing device 124 that can be used by the computing device 124, such as by a mobile app running on the computing device 124, to provide an interface that identifies the candidate components within the building 104. For example, the mobile app running on the computing device 124 can include an augmented reality feature that highlights the candidate components on a display of the computing device 124 in near real-time. Such a feature can help a user appropriately identify the components within the building 104 that are malfunctioning or otherwise in need of service.

Figure 2:
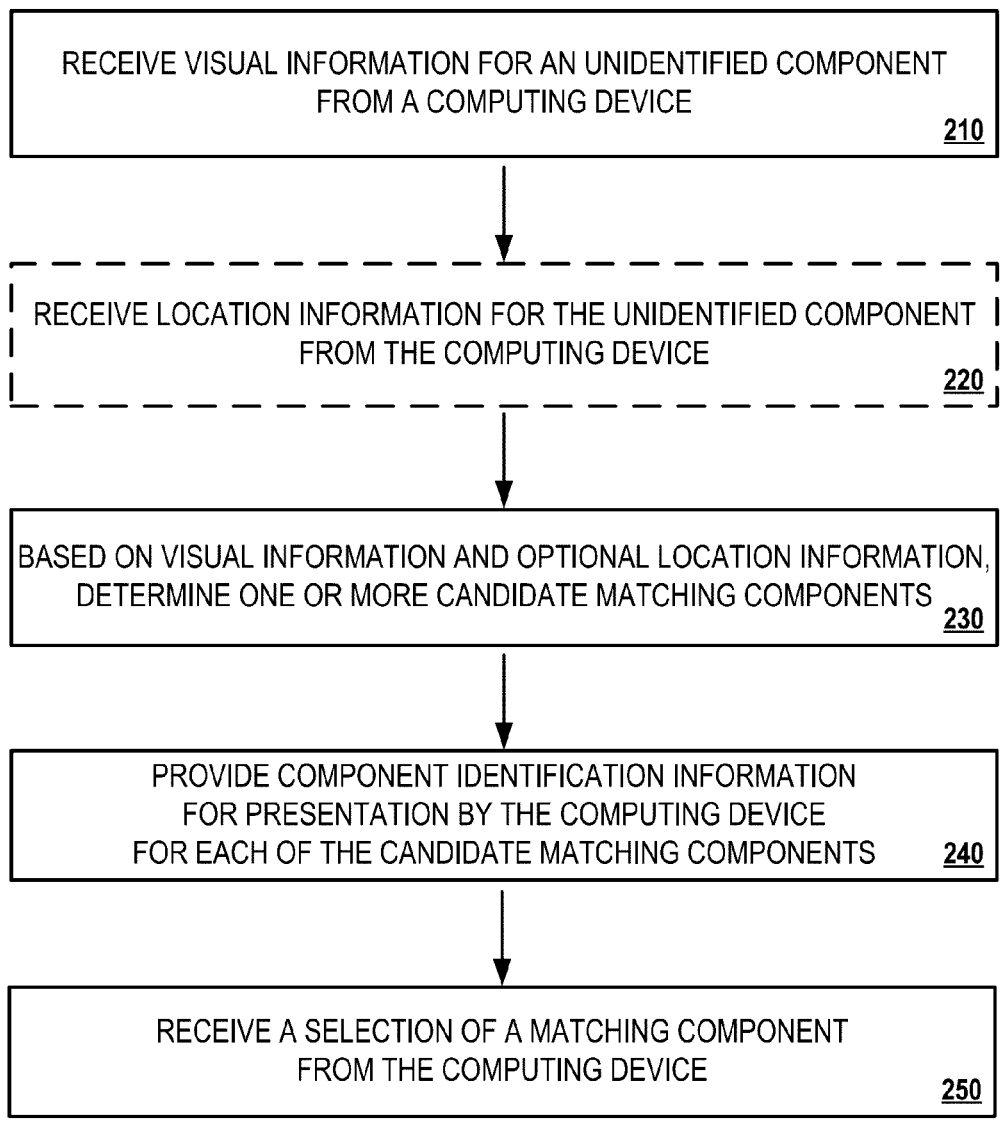
FIG. 2 is a flowchart of an example technique for identifying building components.

Referring to FIG. 2, for example, a flowchart of an example technique 200 for identifying building components is depicted. The example technique 200, for example, can be performed by the computer system 102, and/or by the computing device 124. A user interface can be provided by the computing device 124 to output the candidate component and warranty information, and to receive user selection of one or more of the candidate components as the source of the issue and to receive user input regarding other associated information (e.g., further description of the issue and the problem with the components, availability for service repairs). Such a user interface can be one or more appropriate user interfaces, such as graphical user interfaces (GUI), voice user interfaces, gesture/movement based user interfaces, or any combination thereof. Techniques other than the example technique 200 can be performed to triage building issues and to identify building components.

At 210, the computer system 102 can receive visual information for an unidentified component from the computing device 124. For example, the computing device 124 can provide a photo or video file, and/or a real-time video stream of a component within the building 104 that is malfunctioning or otherwise in need of service. For instance, the computing device 124 can provide an interface, such as a touchscreen interface on a mobile computing device, through which a user can take/select a picture, video, audio recording, and/or other media representing a component.

At 220, the computer system 102 can optionally receive location information for the unidentified component from the computing device 124. For example, the computing device 124 can provide location information corresponding to a location within the building 104, such as information identifying a room selection by a user, GPS (Global Positioning System) data for a current location selected by a user of the computing device 124, wireless beacon signal information (e.g., information identifying nearby wireless transmitters, like WiFi routers and BLUETOOTH enabled devices) identifying nearby wireless beacons and their corresponding signal strengths (which can identify a location within a building), altimeter information identifying a current altitude for the computing device 124 (which can indicate a floor within a building where the computing device 124 is located), digital compass/orientation sensors data (which can indicate a direction that the computing device 124 is facing/oriented towards), motion sensor data (which can identify movements resulting in the computing device 124's location). The location information provided by the computing device 124 can be provided to the computer system 102, which can use the location information to identify a location for the component.

At 230, based on the visual information for the unidentified component and based on the optional location information for the unidentified component, the computer system 102 can determine one or more candidate components that have at least a threshold probability of being the component identified (e.g., photographed) by the computing device 124. For example, the computer system 102 can determine candidate matching components using the building data 122a and based one or more matching techniques (e.g., image recognition techniques, pattern matching techniques) scoring the candidate components along one or more dimensions (e.g., visual similarity to the target component, location similarity, function similarity). For instance, the computer system 102 can compare the received visual information to visual information (e.g., pictures, videos, 2D/3D models) for candidate components to determine a visual matching score for each of the candidate components; the received location information with location installation information that identifies where each of the candidate components were installed in the building at issue to determine location matching scores; and/or other received information (e.g., information identifying an issue with the component, like a water leak, smoke, smell, etc.) with information describing categories and/or attributes of the candidate components (e.g., type of component, range of potential issues associated with component, most common issues with component) to determine additional matching scores. The different scores can be combined (e.g., averaged, median, weighted average based on reliability of different scores, weighted average based on quality of information from the client computing device (e.g., low image quality can weigh visual matching score lower than other matching scores, low accuracy in location information can weigh location matching scores lower) and used to identify components near the location within the building 104 identified at 220.

At 240, the computer system 102 can provide component identification information for presentation by the computing device 124 for each of the candidate components that have been identified as potentially matching the unidentified component visually captured by the computing device 124. For example, the computing device 124 can provide a set of stock images of candidate components, and optionally, additional descriptive information (e.g., product information, location where the components were installed in the building at issues, troubleshooting information) for each of the candidate components. In some implementations, the computing device 124 can provide a visual indication of a candidate matching component that corresponds to an unidentified component visually captured by the computing device 124. For example, an augmented reality feature of the computing device 124 can highlight an unidentified component corresponding to a potentially matching component on a display of the computing device 124 in near real-time.

At 250, the computer system 102 can receive a selection of a matching component from the computing device 124. For example, based on the set of stock images and/or additional descriptive information, a user (e.g., building owner) can identify a candidate component as the component that is implicated in the issue with the building 104.

Referring again to FIG. 1, for example, the building owner 110 can provide input identifying which of the candidate components is/are implicated in the issue with the building 104 and, as indicated by step G (134), the computing device 124 can transmit information regarding the owner's confirmation of the component(s) and further information about the issue with the building 104 to the computer system 102. This information can be provided to the computer system 102 so that the computer system 102 can take appropriate steps to resolve the issue with the building 104.

As indicated by step H (136), the computer system 102 can use the component and building information that is provided by the computing device 124 to further triage the issue with the building 104. Such triaging can include identifying possible problems with the component that may be causing the problem and a range of potential solutions, which may include repairing or replacing the component as well as related components. For example, a leaky sprinkler head (example component confirmed by the building owner 110) that is part of a fire suppression system may, in some instances, simply need to be adjusted but in other instances may need to be replaced.

The triaging can also include determining an appropriate timeframe to resolve the issue, which can be determined based on a level of urgency/severity of the issue as well as other risks associated with the issue. For example, a water leak may be categorized as an urgent issue in need of immediate resolution because of the high potential for the issue to cause extensive damage to the building 104 if left unresolved. In another example, a malfunctioning fire alarm may also be identified as being urgent based on the lack of appropriate fire detection placing both occupants of the building 110 and the building 110 itself at great risk.

The triaging can further include identifying candidate parties to resolve the issue within the appropriate timeframe. Such candidate parties may be parties (e.g., companies, individual workers, contractors) who are preapproved to service the issue under one or more warranties that are covering components that are likely the source of the issue, such as parties who manufactured and/or installed the components. For example, for issues that have been identified as being urgent, the computer system 102 can attempt to identify parties, such as service technicians and other skilled workers, who are available to perform the work within the appropriate timeframe and who have the components that may be needed to resolve the issue. For instance, the computer system 102 can send out service requests to candidate parties regarding the issue, components involved, and requested timeframe for resolution. Based on responses that are received, the computer system 102 can then award the service request to one or more of the candidate parties.

Such a process of soliciting candidate parties is depicted and described with regard to steps I-K below.

The triaging may also include the computer system 102 identifying one or more actions that the building owner 110 can take to mitigate further damage and/or risk from the issue before a service technician or other appropriate party is able to respond to and resolve the issue. For example, in the case of a water leak, the computer system 102 may instruct the building owner 110 to shut off the main water supply to the building 104. Such instructions can draw from the building data 122a for the building 104, and can be customized to the building 104 and the particular issue. For instance, the instructions that are sent to the computing device 124 may include a description of where the building owner 110 should go within the house to the resolve the issue and pictures of components, such as a water shutoff valve, that the owner 110 can use to mitigate the issue. Although not depicted in FIG. 1, such instructions can be output on the computing device 124 in a similar manner to the user interface outputting information about the candidate components and warranty information.

As indicated by step I (138), the computer system 102 can automatically engage appropriate entities, such as the other party 112, to help resolve the issue with the building 104 within the appropriate timeframe, as determined by the computer system 102. Such engagement can include transmitting service requests (and/or other requests), as indicated by step I (138), to a computing device 142 (e.g., laptop computer, mobile computing device (e.g., smartphone, tablet computing device), desktop computer, computer server system) that is associated with the other party 112. As discussed above, the other party 112 may be the same as or different from the builders, contractors, and vendors 108. For example, the other party 112 can be a company (e.g., subcontractor) that installed the components or a company (e.g., general contractor, builder) that directed/oversaw the installation of the components that are causing the issue in the building 104. In another example, the other party 112 can be an entity or entities that may provide warranties for the components that are at issue, such as manufacturers, installers, and/or other warranty providers.

The request 138 can include one or more pieces of information that are relevant to the other party 112 evaluating and responding to the service request. For example, example information 140a-d that is depicted as being provided with the request 138 includes issue information 140a that describes the issue at the building 104 (e.g., information describing a water leak that has been detected in the kitchen of the building 104, information specifying the requested timeframe for resolving the issue), component information 140b that describes the specific components that may need to be repaired and/or replaced as part of resolving the issue (e.g., product make and model for the components, quantities of the components, locations in the building 104 where the components are installed and systems within which the components are being used), building information 140c that describes the building 104 (e.g., location of the building, type of building, building history, such as the year it was built and dates on which services have been performed), and/or pricing information 140d that indicates one or more prices that are being offered to service the issue at the building 104 (e.g., approved reimbursement rate under one or more associated warranties, information indicating that the other party 112 is responsible for servicing the issue at its own expense under one or more associated warranties).

In some implementations, the service request 138 can be provided to multiple other parties 112. For example, the service request 138 can be provided as part of a bidding process in which the other parties 112 submit bids to perform the requested service at the building 104 and the computer system 102 can select one or more of the other parties 112 to perform the service based at least in part on the bids. Bidding can be based on any of a variety of parameters, such as cost, estimated time to completion of the service (e.g., able to complete service the same day, within two days, within two weeks), estimated time to arrive at the job site to begin performing the service (e.g., proximity to the job site, availability to travel to the job site), current stock of and/or ability to obtain the component (e.g., whether the other party currently has the component or parts to repair the component in stock, whether the other party is able to readily obtain the component or repair parts), and/or other appropriate parameters. For example, even though the components that need servicing at the building 106 may be covered under warranty, the warranty provider may be interested in servicing the warranty for the lowest price possible. The computer system 102 can send out the service request 138 on behalf of the warranty holder to multiple other parties 112 to obtain bids from the other parties who are able to resolve the issue at the building 104 within the appropriate timeframe determined by the computer system 102. For all bids received during the bidding period, which may range from a short period of time (e.g., 15 minutes, 30 minutes, 1 hour, 6 hours) to longer periods of time (e.g., 1 day, 3 days, 1 week), the computer system 102 can evaluate the bids and can select one or more of the other parties 112 to service the request based on the bids.

As indicated by step J (144), the computing device 142 of the other party 112 can output information regarding the service request from the computer system 102. For example, the computing device 142 can be a tablet computing device running a mobile app that displays the service request and the associated information 140a-d, and also provides features through which the other party 112 can transmit a response to the computer system 102.

As indicated by step K (146), the computing device 142 of the other party 112 can transmit an acceptance of the service request to the computer system 102. The acceptance can include any of a variety of appropriate details, such as estimated timing information 148a that provides an estimate as to when the service can begin and the duration of the service, pricing information 148b that provides a price quote/estimate for the other party 112 to perform the service at the building 104, and/or location information 148c (e.g., GPS coordinates, zip code, street address, city and state, route information) that identifies the current location of the person or group of people who are going to be travelling to the building 104 to perform the service. Other information can also be provided to the computer system 102, such as information that identifies one or more people who are associated with the other party 112 and who will be servicing the issue at the building 104, such as workers within a company (e.g., plumbers working for a plumbing company) and/or subcontractors. Such information can be used to establish communication with these other people so that the computer system 102 can obtain updates from these other people, which can additionally be provided to the building owner 110 and other interested parties (e.g., warranty providers, insurers).

The computing device 142 can periodically (e.g., every 5 second, every 10 minutes, every hour, every day) provide updates of the information 148a-c after initially responding and until the issue at the building 104 has been resolved. For example, a mobile app that is running on the computing device 142 can provide an initial acceptance of the service request at the building 104, and can thereafter provide updates as to the location 148c of the other party 112 and estimates of the time to start/completion 148a as well as the pricing information 148b.

As indicated by step L (150), the computer system 102 can transmit information 152a-b regarding the service request to the computing device 124 of the building owner 110. The information 152a-b can include a variety of details regarding the service request and/or the other party who will be resolving the issue at the building 104, such as the timeframe 152a for resolution of the issue and information 152b regarding the other party 112. The timeframe information 152a can include information similar to the estimated timing information 148a, such as information indicating when the other party 112 will arrive at the building 110, an expected duration of the work, and/or an expected time when the work will be completed and the issue will be resolved. The information 152b can a variety of information about the other party 112, such as the name and contact information for the other party 112, training and experience level of the other party 112, particularly with regard to the issue at the building 104, current location of the other party 112, reviews of the other party 112 by other users, and/or price estimates (e.g., total price estimate, information indicating portions of the price estimate that will be the responsibility of the building owner 110 under one or more warranty or insurance plans, information indicating that the other party 112 is approved to provide service under the warranty for the components) for the other party 112 to service the request. Similar to step F (132), the information regarding the service request can be output by the computing device 124, such as on a mobile app.

The computing device 124, such as through a mobile app, may provide the building owner 110 with features through which the building owner 110 can further customize the service on the building 104, such as requesting a particular time for the service provider to arrive at the building 102 and/or requesting a different or specific service provider (e.g., someone other than the other party 112). Such requests can be transmitted back to the computer system 102, and can trigger additional communication with the other party 112 or other people/companies, similar to the communication in steps I-K.

Through the computing device 124 and applications (e.g., mobile app, web browser) running thereon the building owner 110 can additionally provide reviews of the work being performed on the building and can confirm whether the issue with the building 104 has been resolved by the other party 112. For example, a user interface can be provided on the computing device 124 through which the building owner 110 can provide a rating for the other party 112 with regard to one or more factors (e.g., timeliness, professionalism, ability to effectively resolve the issue) and can confirm that the issue has been resolved. Such features may only become available on the computing device 124 of the building owner 110 after the other party 112 has indicated that their work on the building 110 has been completed, confirmation of which can be transmitted to the computer system 102 by the computing device 142. Such reviews that are provided upon completion of the work can provide more succinct and accurate information about the other party 112, which may be used by the computer system 102 when soliciting and/or selecting parties to service building issues in the future.

As indicated by step M (154), the computing device 124 can transmit confirmation that the service has been completed and the issue has been resolved (along with other information, such as reviews of the other party 112) to the computer system 102.

As indicated by step N (156), the computer system 102 can process and store information about the service request. Such processing can include determining who is responsible for reimbursing the other party 112 for the services and parts used, and also determining an appropriate rate of reimbursement. For example, the computer system 102 can determine whether one or more warranty providers and/or insurers are responsible for payment of the other party 112, and/or an extent to which the building owner 110 is responsible for some or all of the costs. The computer system 102 can include e-commerce features that can automatically invoice, obtain payment consents, and electronically process payments (e.g., credit card payments, electronic fund transfers) for the services with the appropriate parties.

The computer system 102 can additionally store the information regarding the service request, such as the date on which the service was performed, the cause of the issue identified by the building owner 110 as determined by the other party 112 providing the service, components that were verified to be problematic, actions that were performed (e.g., test/diagnose issue, review product/training manual on issue, repair components) by the other party 112 to resolve the issue, costs for resolving the issue, the time it took to resolve the issue (e.g., time for the other party 112 to arrive at the building, time to resolve the issue once at the building 104), reviews of the other party 112, and/or information identifying new components/parts that were installed in the building 104. Such information can be stored in one or more data repositories, such as the building data 122a. This information can be combined with similar information from other service calls for the same or other buildings, and can be used to provide analytics to any of a variety of entities, such as to the builders, contractors, and vendors 108, to manufacturers, to insurers and/or warranty providers, and/or to other parties (e.g., the other party 112). For example, analytics can be provided to builders, contractors, and vendors 108 indicating which components and systems building owners are having problems with, when the issues that are reported are a result of component malfunction/failure vs. user error, and/or the timeframe within which these issues are arising. Such information can be helpful to the builders, contractors, and vendors 108 so as to better inform them of which components and systems to select for future projects, gaps in education of systems to building owners, and appropriately prices and lengths of time for warranties. Such analytics can be provided using any of a variety of appropriate techniques, such as machine learning techniques (e.g., neural networks, clustering, regressions, decision trees) that can identify correlations and associations across large data sets, such as correlations that can indicate that particular components are faulty.

Figure 3:
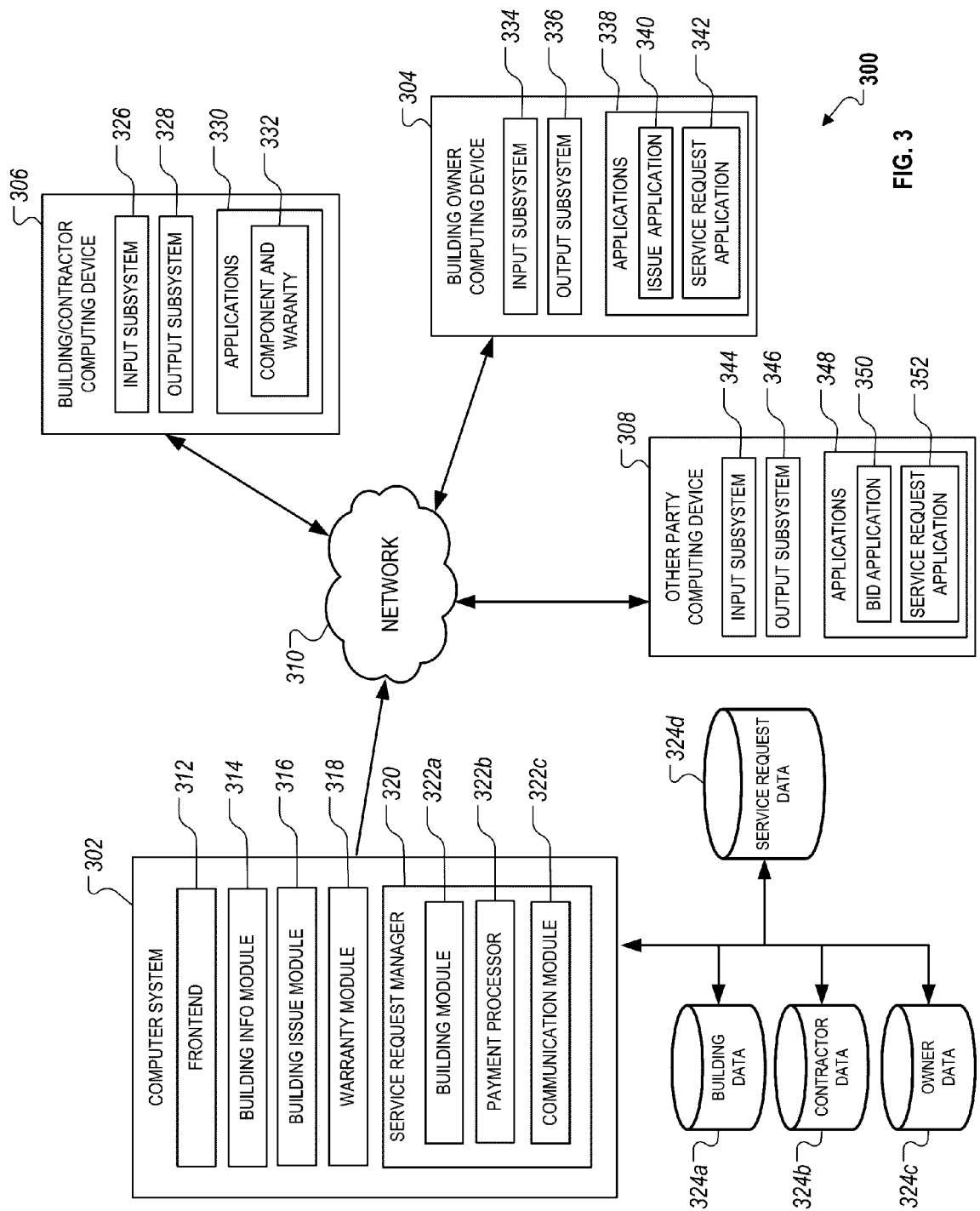
FIG. 3 is a diagram of an example system for managing and servicing building components.

FIG. 3 is a diagram of an example system 300 for managing and servicing building components. The example system 300 includes an example computer system 302, an example building owner computing device 304, an example builder/contractor computing device 306, an example other party computing device 308, and an example network 310. The computer system 302 can be similar to the computer system 102 described above with regard to FIG. 1 and can manage component and warranty information for buildings, and can assist with triaging issues with buildings and resolving such issues. The building owner computing device 304 can be similar to the computing device 124 described above with regard to FIG. 1, and can be used by building owners (or other people who are responsible for or work/live in a building) to identify and resolve issues in buildings. The builder/contractor computing device 306 can be used by builders, contractors, and vendors (or others who install components within buildings) to provide details about components and systems that are installed within buildings. The other party computing device 308 can be similar to the computing device 142 described above with regard to FIG. 1 and can be used to respond and fulfill service requests.

The computer system 302 can be any of a variety of appropriate systems including one or more computing devices, such as computer servers, desktop computers, laptop computers, mobile computing devices, cloud computing systems, and/or other appropriate computing devices/systems. The computing devices 304-308 can be any of a variety of appropriate mobile computing devices, such as smartphones (e.g., IPHONE, ANDROID smartphones), cell phones (e.g., feature phones), tablet computing devices (e.g., IPADs, ANDROID tablets), personal digital assistants (PDAs), computing devices embedded within vehicles (e.g., in-vehicle computer systems with displays and/or user interfaces built into the vehicles' consoles, vehicle mounted computing devices, golf carts with embedded computing devices), wearable computing devices (e.g., GOOGLE GLASS), laptop computers, netbook computers, and/or other appropriate mobile computing devices. The computer system 302 and the computing devices 304-308 can communicate with each other over the network 310, which can be any of a variety of appropriate communication networks, such as the internet, mobile data networks (e.g., 3G/4G mobile data networks), wireless networks (e.g., Wi-Fi networks, BLUETOOTH networks), local area networks (LANs), wide area networks (WANs), virtual private networks (VPNs), fiber optic networks, cellular networks, and/or any combination thereof.

The computer system 302 is depicted as including a frontend 312 that receives, processes, and responds to requests from client devices, such as the computing devices 304-308. The frontend 312 can include one or more processes that receive communications over the network 310 on one or more network ports, such as a 0 process and/or a mobile application backend process.

The computer system 302 further includes a building information module 314 that is configured to obtain building information from client computing devices, such as the builder/contractor computing device 306, and to store the information in one or more data repositories 324a-d, such a building data repository 324a that stores building and component information similar to the building data repository 122a described above with regard to FIG. 1.

The builder/contractor computing device 306 can obtain and provide such building information to the building information module 314 over the network 310 through the use of its input subsystem 326, its output subsystem 328, and the one or more applications 330 that are installed on the device 306, such as a component and warranty application 332. The input subsystem 326 can include one or more appropriate input devices through which a user of the device 306 can provide input, such as a touchscreen, physical buttons/keys, microphones, cameras, and/or other appropriate input devices (e.g., accelerometers, gyroscopes). The output subsystem 328 can include one or more appropriate output devices through which information can be provided to a user, such as a display, speakers, haptic feedback devices (e.g., vibration device), and/or other devices that are in communication with the device 306 (e.g., wireless headset). The applications 330 can be of any of a variety of appropriate types, such as software (e.g., mobile app), hardware (e.g., application specific integrated circuit (ASIC)), and/or firmware. The component and warranty application 332 can be programmed to obtain information about components that have been installed in buildings through, for example, the input subsystem 326 (e.g., bar code scan using a camera, typed input) and/or data sources (e.g., document including a bill of materials) that are accessible to the device 306, and to transmit such information to the computer system 302 over the network 310.

The computer system 302 further includes a building issue module 316 that is programmed to triage building issues that are raised by users, such as a user associated with the building owner computing device 304. The building issue module 316 is programmed to receive issues that are identified by users, to identify specific candidate components that are installed in the buildings that are associated with the issues (e.g., through referencing the building data repository 324a and owner data 324c), to transmit information (e.g., images, description of where components installed in specific building) about the candidate components to the users' computing devices (e.g., device 304), to receive further clarifying input from users regarding issues, and to identify one or more components that are likely causing the building issues. As described above with regard to step H (136), the building issue module 316 can additionally be programmed to determine levels of urgency for building issues, to determine appropriate timeframes for resolution, and to provide users with recommended steps for mitigating further damage and/or danger within their buildings as result of the issues.

The building owner computing device 304 can provide such information about building issues to the computer system 302 through the use of an input subsystem 334 (can be similar to the input subsystem 326), an output subsystem 336 (can be similar to the output subsystem 228), and one or more applications 338 that are installed on the device 304, such as a building issue application 340 and/or a service request application 342. Similar to the applications 330, the applications 338 can be implemented on the device 304 as software, hardware, and/or firmware. The building issue application 340 can include interfaces that guide a user through appropriately identifying the issue that the user is attempting to resolve, including categorized groupings of components and issues, images of components that are installed in the building, and/or taking images of components using cameras that may be part of the input subsystem 334. The service request application 342, which can be part of or separate from the building issue application 340, can facilitate scheduling, managing, and reviewing service requests.

The computer system 302 further includes a warranty module 318 that is programmed to determine whether building issues and components that are associated therewith are covered under one or more warranties, such as a manufacturer's warranty. The warranty module 318 can be used by the computer system 302 to identify which entity is financially responsible for resolving building issues that are raised by users.

The computer system 302 further includes a service request manager 320 that is programmed to facilitate and manage service requests that are used to resolve building issues that are raised by users, such as by communicating with service providers, warranty providers, and/or insurers. The service request manager 320 includes several subcomponents 322a-c, including a bidding module 322a that is configured to solicit and manage bidding processes for service requests, a payment processor 322b that is configured to identify and bill appropriate entities (e.g., building owner, warranty provider, insurer) for work performed, and a communication module 322c that is configured to manage communication with all entities associated with service requests, such as building owners (e.g., computing device 304), builders/contractors (e.g., computing device 306), and/or service and warranty providers (e.g., computing device 308).

The computer system 302 can use one or more data sources 324a-d, such as a building data source 324a that can store information about buildings (e.g., component information), a contractor data source 324b that can store information about contractors/builders/vendors/service providers, an owner data source 324c that can store information about building owners, and a service request data source 324d that can store and log information about both completed and pending service requests.

Like the computing device 142 described above with regard to FIG. 1, the other party computing device 308 can be associated with any of a variety of entities that may be involved with service requests, such as service providers (e.g., builders, contractors, vendors), component manufacturers, warranty providers, and/or insurers. In some instances, the computing device 306 is the same as the computing device 308 (e.g., builder of home is also the service provider on a service request for the home). The service request manager 320 can communicate with the other party computing device 308 with regard to service requests, such as with regard to bid requests and service requests that have been assigned to the associated other party. Like the computing devices 304 and 306, the computing device 308 includes an input subsystem 344, an output subsystem 346, and one or more applications 348, such as a bidding application 350 that is programmed to process and respond to bid requests and a service request application 352 that is programmed to manage and facilitate the fulfillment of service requests. The bidding application 350 and the service request application 352 can be part of the same or different applications.

Figure 4B:
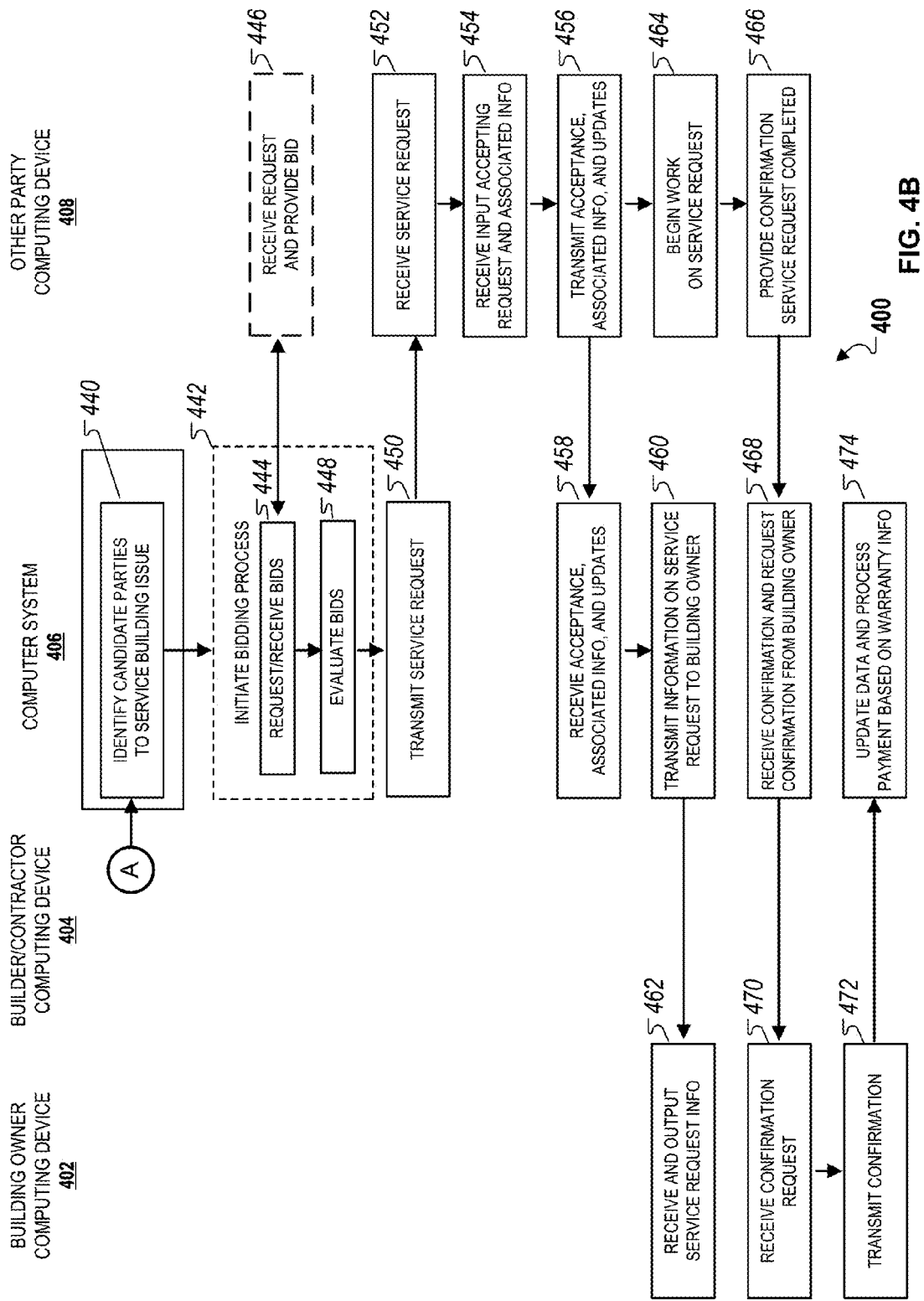

FIGS. 4A-B depict a flowchart of an example technique 400 for triaging and resolving issues in a building through a service request. The example technique 400 is depicted as being performed by a building owner computing device 402, a builder/contractor computing device 404, a computer system 406, and another party computing device 408. The building owner computing device 402 can be any of a variety of appropriate computing devices, such as the computing device 124 and/or the computing device 304. The builder/contractor computing device 404 can be any of a variety of appropriate computing devices, such as the computing device 306. The computer system 406 can be any of a variety of appropriate computer systems, such as the computer system 102 and/or the computer system 302. The other party computing device 408 can be any of a variety of appropriate computing devices, such as the computing device 142 and/or the computing device 308.

At 410, the builder/contractor computing device 404 can receive user input about component and warranty information in a building. The builder/contractor computing device 404 can transmit the component and warranty information to the computer system 406 (412), which can receive and store the component and warranty information (414).

The building owner computing device 402 can receive user input about issues in the building for which the component and warranty information was stored (416) and can transmit the initial information about the building issue to the computer system 406 (418).

The computer system 406 can receive the initial information and, based on the initial information and the stored component information for the building, can identify candidate components that may be causing or otherwise impacted by the issue (420). The computer system 406 can transmit information about the candidate components back to the building owner computing device 402 (422).

The building owner computing device 402 can receive and output information about the candidate components (424) and receive further user input clarifying the building issue based on the candidate components (426), such as the user selecting one or more components from the candidate components as being the cause of the building issue. The building owner computing device 402 can transmit information about the clarified building issue, such as the user selected components, to the computer system 406 (428).

The computer system 406 can receive the additional building issue information (430) and can triage the building issue based, at least in part, on building issue information (initial and additional information) and the previously uploaded information about the components in the building and their associated warranties (432). The triaging can include any of a variety of appropriate steps, such as identifying additional components that may be related to the issue and that may not have been identified by the user (434), determining warranty coverage for the building issue (436), determining a level of urgency/emergency for the building issue (438), and identifying candidate parties to service the building issue (440).

With candidate parties identified, in some implementations the computer system 406 can request and receive bids to perform a service request to resolve the building issue (442). For example, the computer system 406 can send a request for bids to one or more candidate parties (e.g., builders, contractors, vendors), such as the entity associated with the other party computing device 408 which can receive the request and respond with one or more bids (446). With the bids received, the computer system 406 can evaluate the bids and select one or more winning bids to service and resolve the building issue (448).

The computer system 406 can then transmit a formal service request for the building issue to one or more entities that either won a bidding process or that were otherwise selected by the computer system 406, such as during the triaging (450). The formal service request can include a variety of details regarding the service request, such as the level of urgency, the required timeframe for commencement and completion of the service, the location of the building, the specific components that are implicated in the building issue, and other appropriate information.

The other party computing device 408 can receive and output information about the service request (452), and can receive input from one or more users regarding the service request, such as an acceptance of the service request and other pertinent details (e.g., price information, current geographic location of the assigned worker, estimated time work will commence, estimate time when work will be completed, availability/accessibility of components and/or tools needed to complete the service request) regarding the other party fulfilling the service request (454). The other party computing device 408 can transmit the acceptance of the service request and the associated information to the computer system 406, and can also transmit updates to that original information (e.g., acceptance, associated information) as they become available (456). For example, updates to the current schedule and geographic location of the worker assigned to the service request can be provided to the computer system 406 so that the computer system 406 can accurately inform the building owner of the estimated time of arrival for the worker.

The computer system 406 receives the acceptance of the service request, the associated information, and updates from the other party computing device 408 (458), and transmits information about the service request to the building owner computing device 402 (460). The information that is transmitted can include a variety of details regarding the service request, such as an identity of the other party, reviews and rating information for the other party, an estimated time when the other party will arrive at the building, an estimated time to resolve the building issue, the determined level of urgency for the issue, instructions on actions for the building owner to take to mitigate further damage and/or to ensure safety of the building's occupants, whether the issue is covered under warranties or insurance policies, and cost estimates to resolve the building issue. The building owner computing device 402 receives and outputs the service request information (462).

The other party that is associated with the other party computing device 408 begins working on the service request (464), which can be indicated to the computer system 406 through status updates provided by the other party computing device 408. Upon completion of the service request, the other party computing device 408 can transmit confirmation that the service request has been completed along with details regarding the work performed, such as actions taken by the worker, specific components that were repaired and/or replaced, the duration of the service request, and other appropriate details (466).

The computer system 406 can receive the confirmation and request further confirmation from the building owner that the work has been completed (468). The building owner computing device 402 can receive the request for further confirmation (470) and, in response to user input (e.g., selecting a button confirming that the work was performed, providing an electronic signature), can transmit confirmation back to the computer system 406 (472). In response to receiving the confirmation from the building owner computing device 402, the computer system 406 can update data associated with the service request and can process payment for the work based, at least in part, on the actual work performed and any warranty/insurance coverage for the issue (474). A variety of data can be updated in association with the service request, such as data associated with the building (e.g., information regarding components that are installed in the building), the service request (e.g., update information regarding the work performed as part of the service request), and the building owner and other party (e.g., update information indicating that the building owner and other party were both associated with the service request).

Figure 5A:
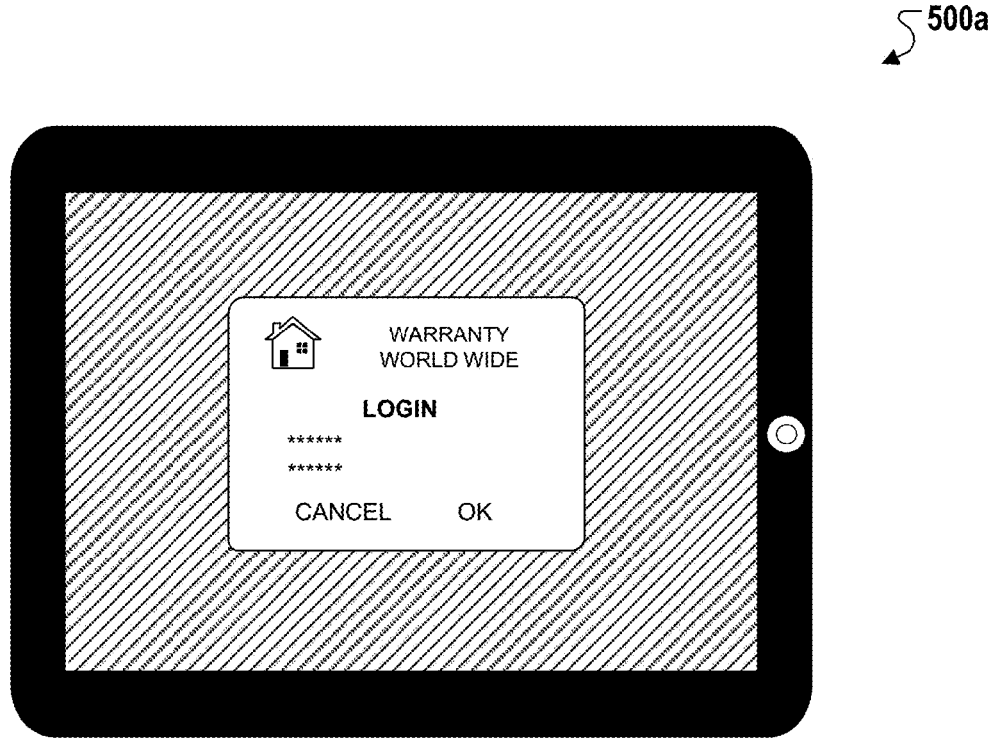
FIGS. 5A-Q are screenshots of an example mobile application that can be used by field service providers, such as builders, contractors, vendors, and other service providers.
Figure 5B:
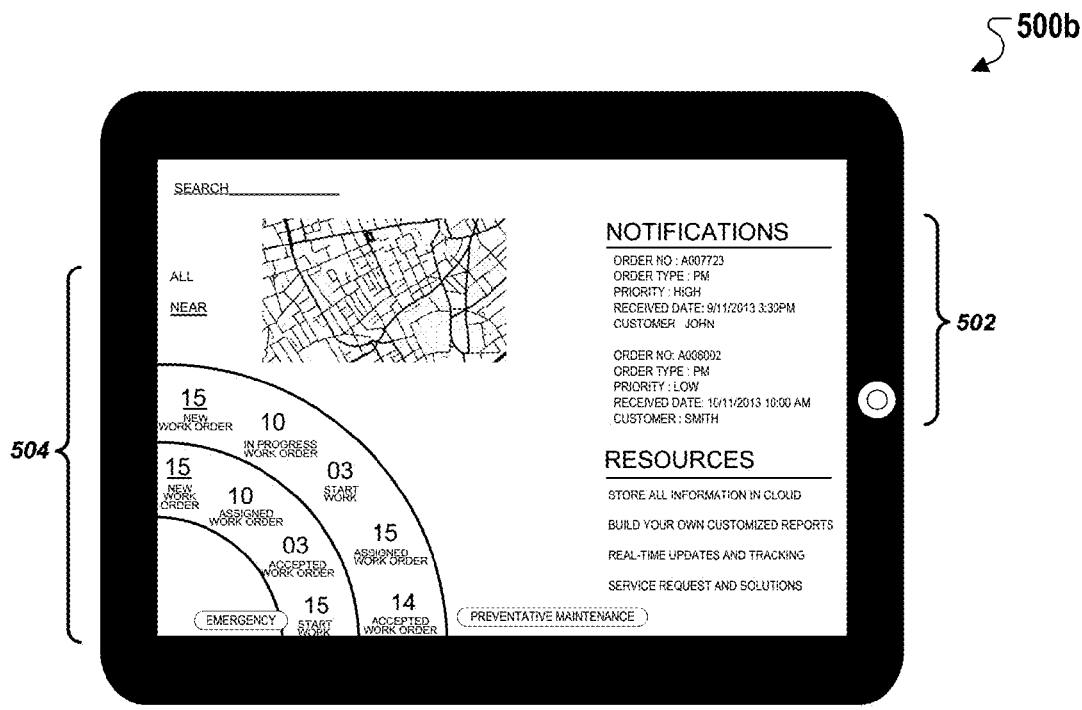
Figure 5C:
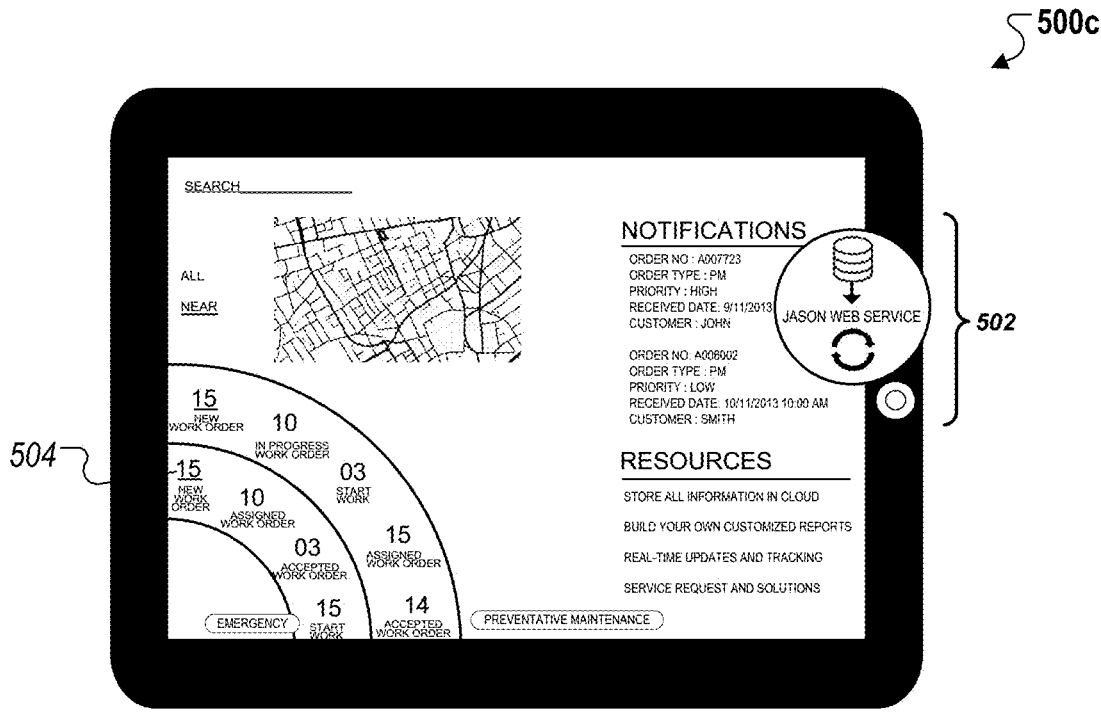
Figure 5D:
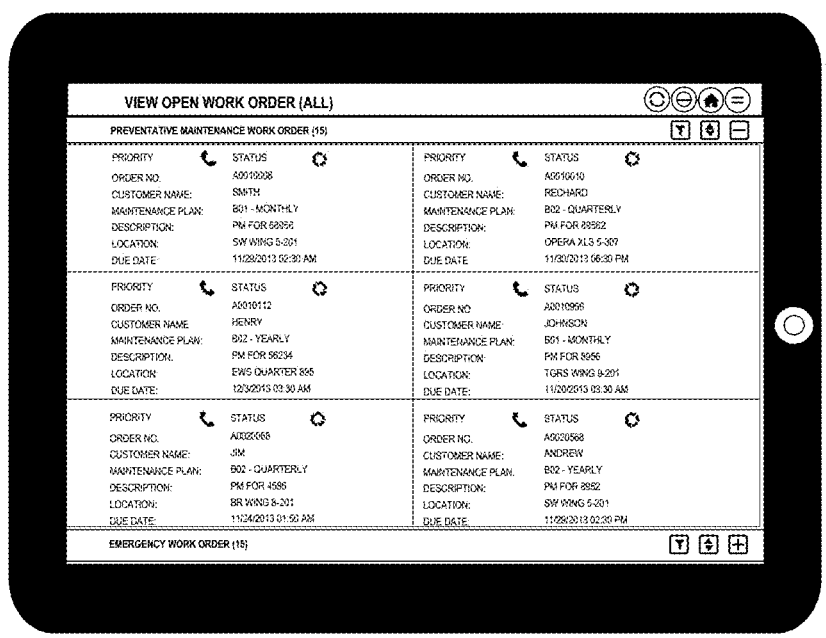
Figure 5E:
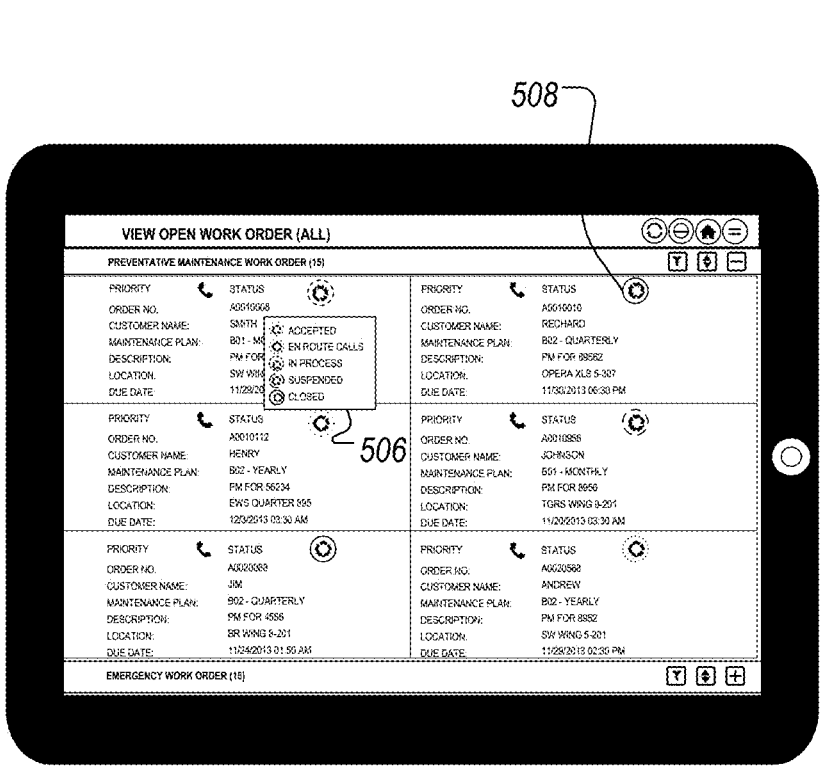
Figure 5F:
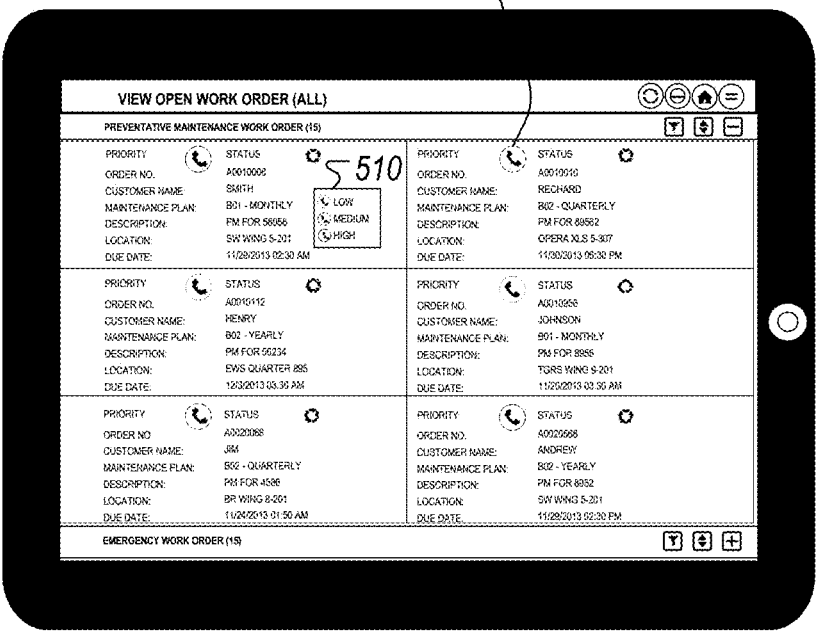
Figure 5G:
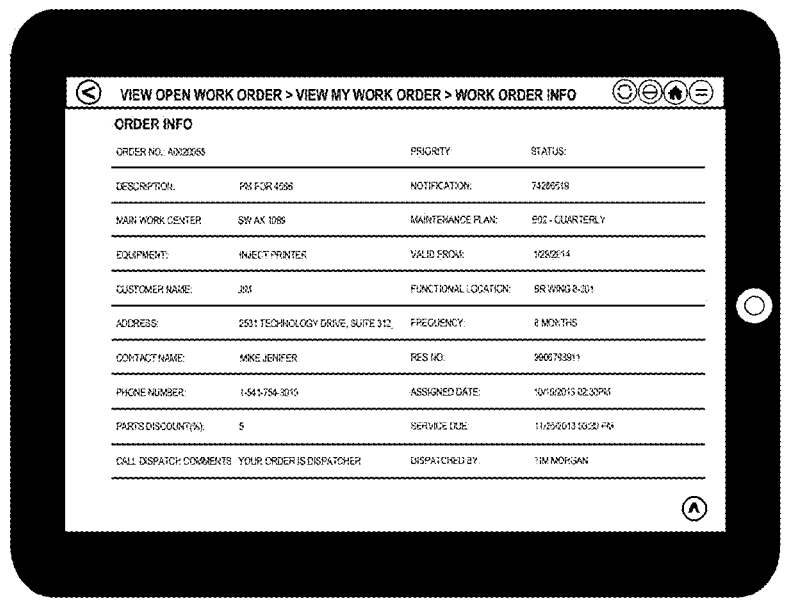
Figure 5H:
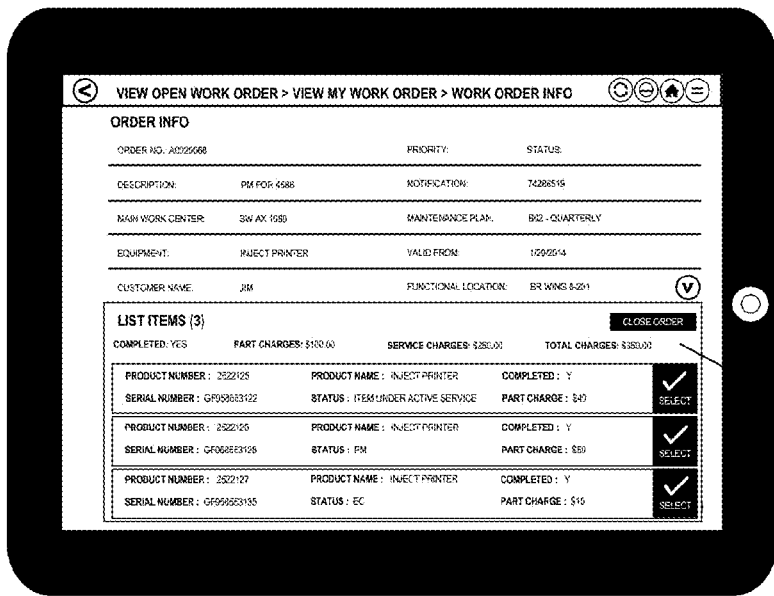
Figure 5I:
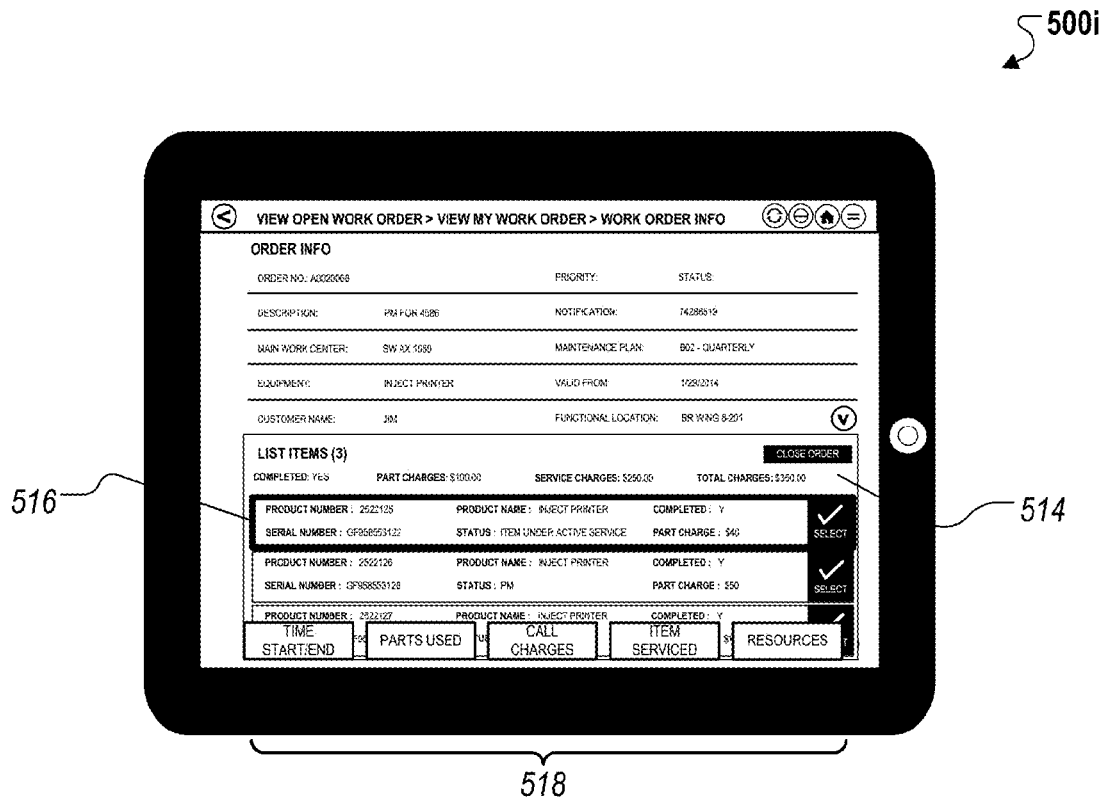
Figure 5J:
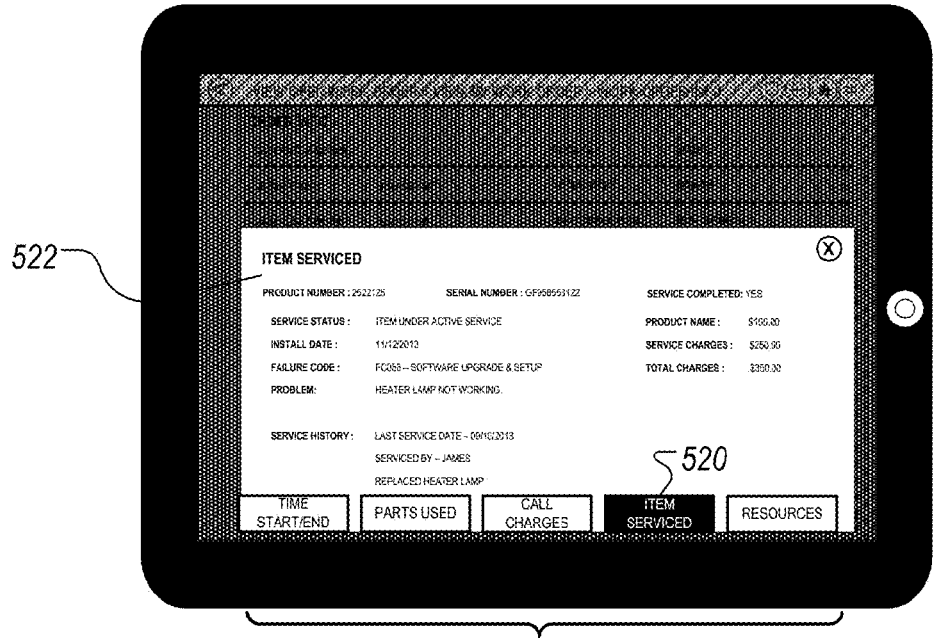
Figure 5K:
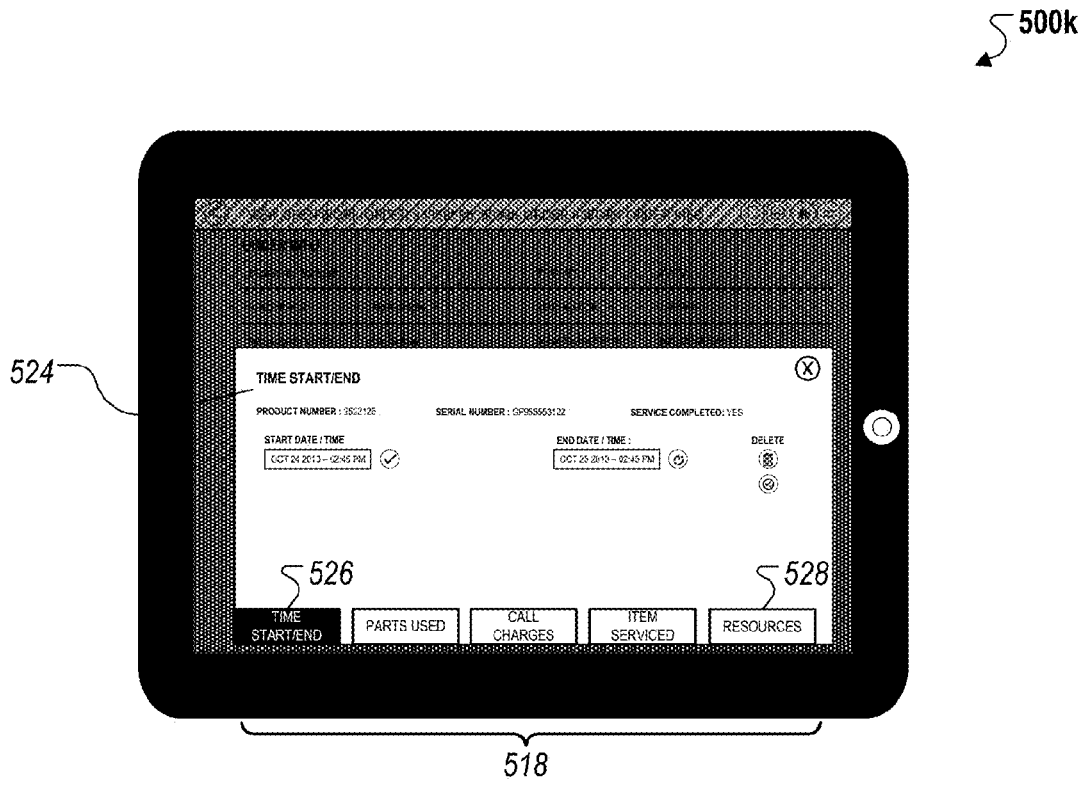
Figure 5L:
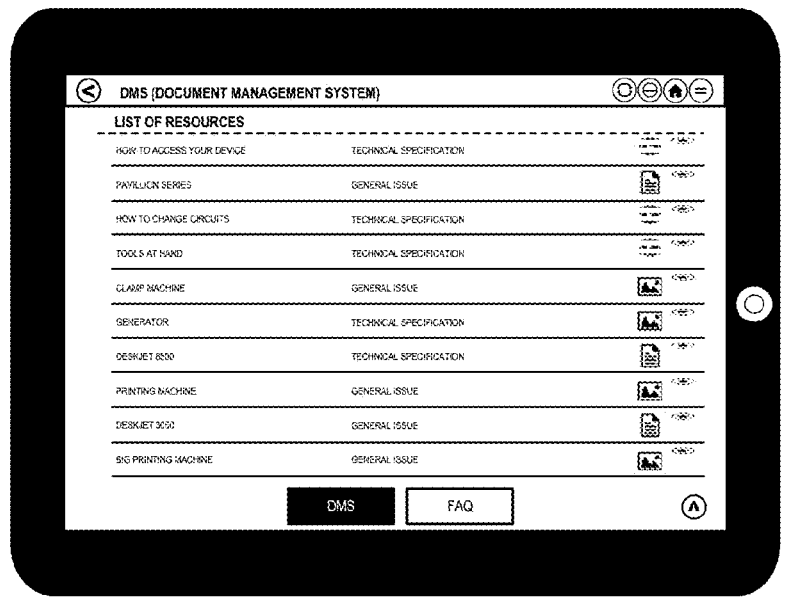
Figure 5M:
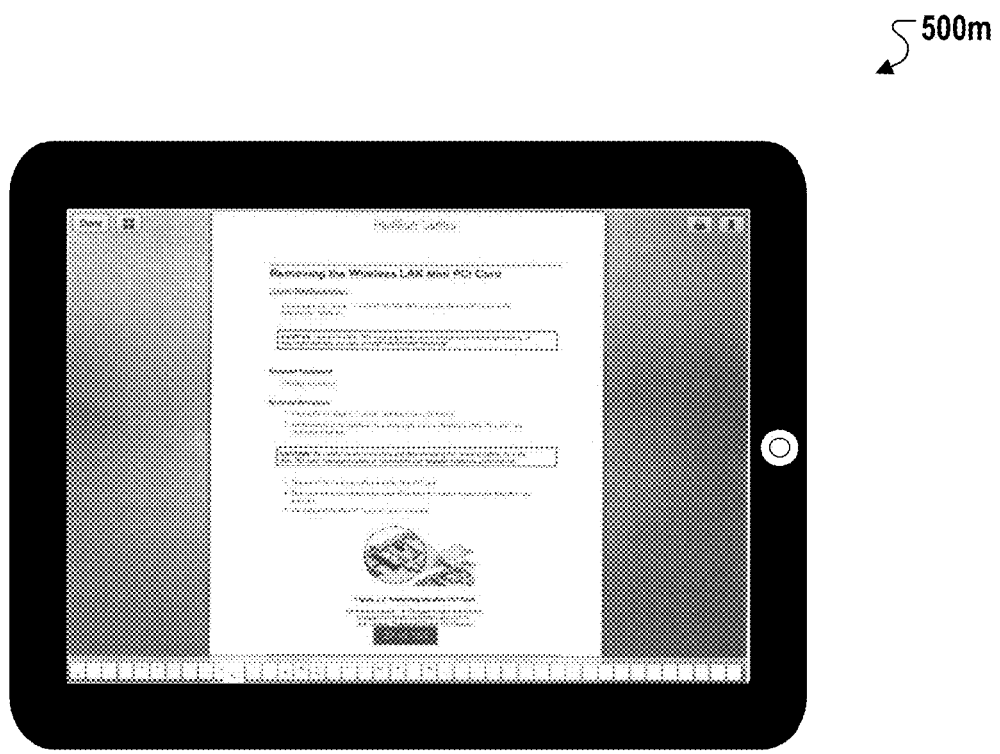
Figure 5N:
Figure 5O:
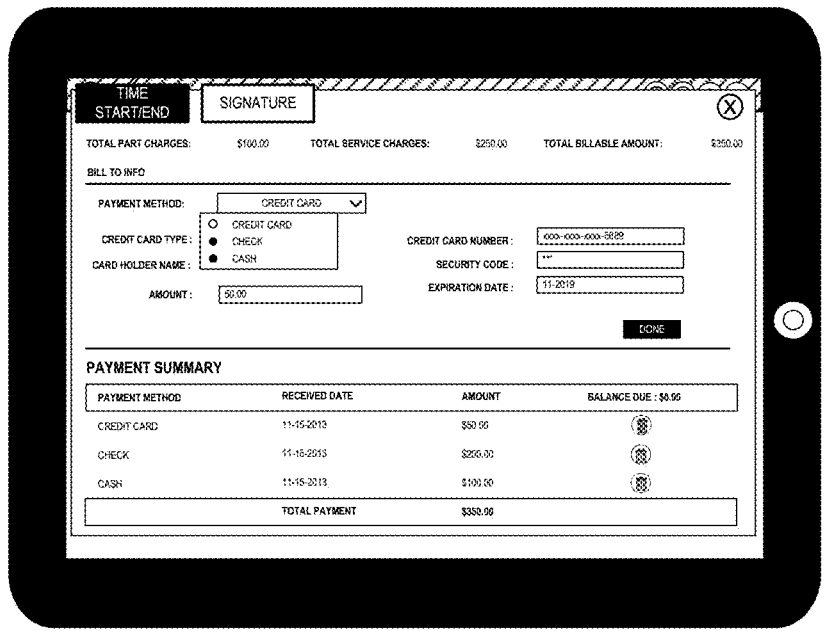
Figure 5P:
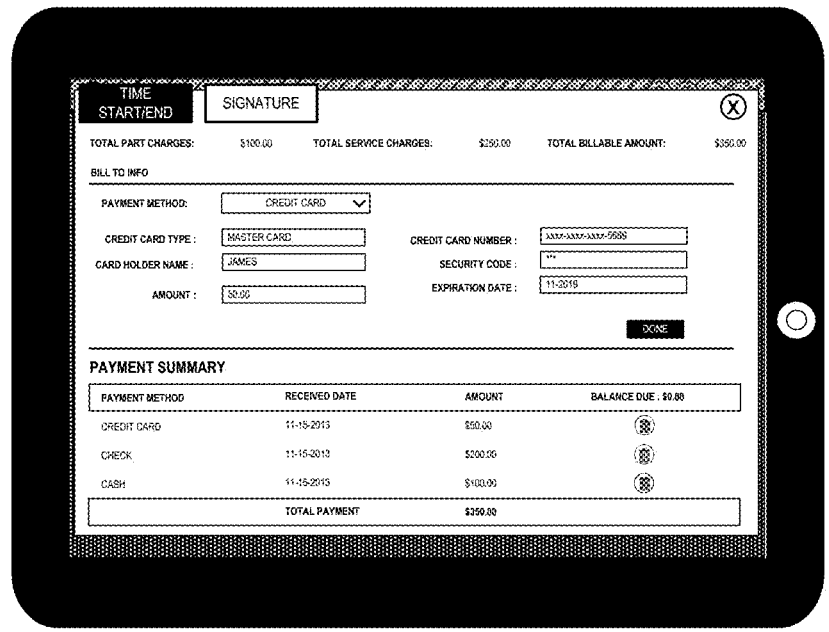
Figure 5Q:

FIGS. 5A-Q are screenshots 500*a-q* of an example mobile app that can be used by field service providers, such as builders, contractors, vendors, and other service providers. Such a mobile app can be similar to the mobile applications 330 and 348 discussed above with regard to FIG. 3, and can be implemented on one or more appropriate computing devices, such as the computing devices 142, 306 and 308.

Such a mobile app can provide a variety of features, which are depicted across the screenshots 500*a-q*. For example, such a mobile app can provide real-time updates in a dashboard to users; can create, assign, and update work orders with minimal input and effort (e.g., single touch work order processing) from users; can perform automatic and dynamic scheduling for work orders to more efficiently process service requests, such as through the use of current geographic locations for both workers and service requests; can incorporate location information with each service request; can provide instant access to all resources related to service requests, such as photos, videos, and documents describing/depicting the building issue; and can provide offline access to all useful information when internet access is not available.

Referring to FIG. 5A, the screenshot 500a depicts an example login screen for a field service provider.

Referring to FIG. 5B, the screenshot 500b depicts an example dashboard screen for a field service provider. The dashboard can include a notification area 502 in which notifications for service requests can be displayed, such as upcoming scheduled service appointments, new service requests, and urgent service requests. The dashboard also includes service order overview feature 504 in which the user can see the status of various service orders that are pending. A variety of categories can be used in the feature 504, including new work orders, work orders in process, started work orders, assigned work orders, and accepted work orders. The work orders can be broken down further, such as into emergency orders and preventative maintenance orders, and based on whether the orders are nearby the user's current geographic location.

Referring to FIG. 5C, the screenshot 500c depicts that real-time syncing, such as through services like JavaScript Object Notation (JSON) web services, can be used to sync information between the backend server system (e.g., computer system 102, computer system 302) and the mobile app. Any and all information that is used by the mobile app can be synced, such as the information that is displayed in the notification area 502. Syncing can occur at regular intervals whenever an internet connection is available to the device, such as every 5 seconds, every 10 seconds, every 30 seconds, every minute, every 5 minutes, every 15 minutes, and/or other appropriate time intervals.

Referring to FIG. 5D, the screenshot 500d depicts a scheduling interface through which real-time schedule and status information for work orders can be viewed. Schedules can be customized in a variety of ways, such based on whether the work orders are for preventative maintenance or emergencies.

Referring to FIG. 5E, the screenshot 500e depicts a status feature 506 that is part of the scheduling interface through which a user can designate the status of a work order. In the depicted example, the user can designate that an order has been accepted by a worker, that a worker is en route to the call, that the work is in process, that the work has been suspended, and that the work has been cancelled. Status icons 508 are presented with the orders to indicate the current status of the orders.

Referring to FIG. 5F, the screenshot 500f depicts a priority feature 510 that is part of the scheduling interface through which a user can designate the priority/urgency of a work order. In the depicted example, the user can designate that an order has either a low, medium, or high level of priority. Status icons 512 are presented with the orders to indicate the priority level of the orders.

Referring to FIG. 5G, the screenshot 500g depicts a detailed view of an example work order, which includes a variety of details regarding the order, such as the equipment that is at issue, the dates on which the order was received, the location of the work order, and the contact information for the user. Detailed views of work orders can be accessed by selecting individual work orders from a variety of other interfaces, such from the notification area 502 and/or the scheduling interface depicted in FIGS. 5D-F.

Referring to FIG. 5H, the screenshot 500h depicts a component list 514 for the work order being expanded as part of the view of the work order. The component list 514 is depicted as being collapsed in the screenshot 500g. The component list 514 provides specific information about the components that are in need of being serviced as part of the work order, including specific product names, product numbers, serial numbers, status information, and cost information.

Referring to FIG. 5I, the screenshot 500i depicts a user having selected a first component 516 from the component list 514. The user is then provided with a set of options 518 for the selected component 516.

Referring to FIG. 5J, the screenshot 500j depicts a user having selected the "item serviced" option 520 from the set of options 518 for the selected component 516. Selection of this option 520 causes more detailed information about the component 516 to be displayed in the item serviced area 522, which includes a picture of the item, a history of the item (e.g., install date, service history) as it pertains to the specific work order, and information (e.g., error code, problem description) about the issue that is being experienced with the component.

Referring to FIG. 5K, the screenshot 500k depicts the user having selected the "time start/end" option 526 from the set of options 518 for the selected component 516. Selection of this option 526 causes a time start/end interface 524 to be displayed, through which a user can designate a start date/time and end date/time for when the service for that specific component 516 was performed.

Referring to FIG. 5L, the screenshot 500l depicts a list of selectable and viewable resources (e.g., videos, images, training manuals, PDFs) that are available for the user to access. Such resources can be accessed by workers to learn about how to use the mobile app and/or how to perform various service-related work, such as repairing or replacing a specific component. The list of resources can be presented to a user having selected the "resources" option 528 from the set of options 518 for the selected component 516. In such a situation, the list of resources can be related to the selected component 516 and the issue/problem with the selected component 516 that is the reason for the work order. In some implementations, the list of resources may include resources (e.g., photos, videos) provided by a building owner in regard to an issue with a component.

Referring to FIG. 5M, the screenshot 500m depicts an example document resource being presented on the mobile computing device and to the user, such as in response to the user selecting an entry for the document resource from the list of resources depicted in screenshot 500l.

Referring to FIG. 5N, the screenshot 500n depicts an example video resource being presented on the mobile computing device and to the user, such as in response to the user selecting an entry for the video resource from the list of resources depicted in screenshot 500l.

Referring to FIGS. 5OO-Q, the screenshots 500o-q depict example user interfaces through which payments from users can be processed, including by credit card, check, and cash, and through the use of electronic signatures.

FIGS. 6A-H are example screenshots 600a-h of an example mobile application that can be used to address building issues. The example application can run on a mobile computing device that is associated with a building owner, such as the computing device 124 that is associated with the building owner 110 and/or the building owner computing device 304. The screenshots in FIGS. 6A-H depict an example sequence of screens though which the building owner could address issues related to one or more components/systems (e.g., fire sprinkler systems) that are installed in a building, including submitting building issues and setting up service appointments.

Figure 6C:
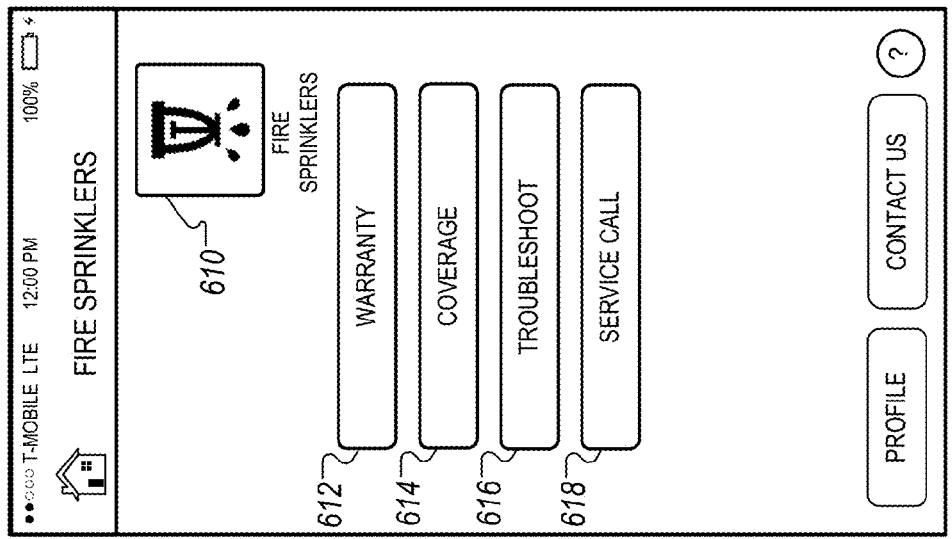
FIGS. 6A-H are screenshots of an example mobile application that can be used to address building issues.
Figure 6B:
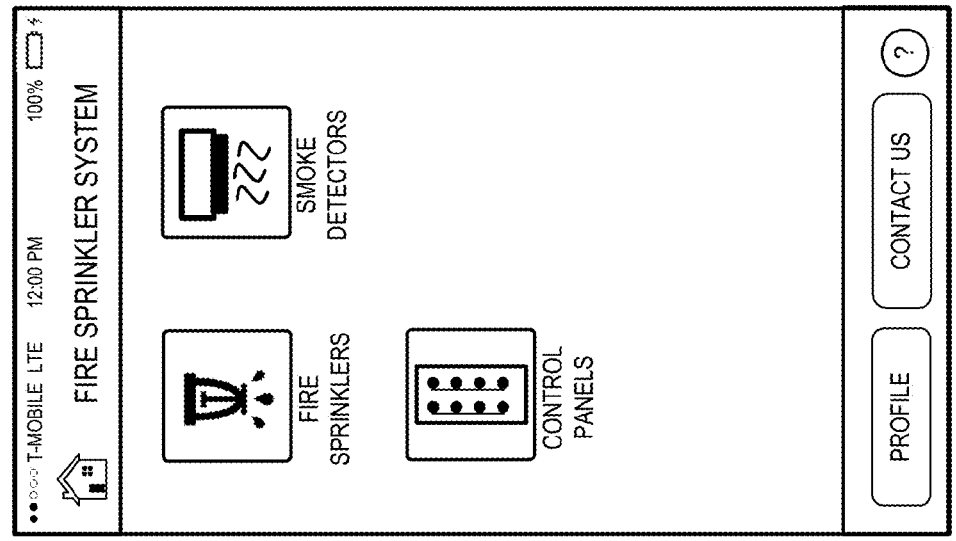
Figure 6A:
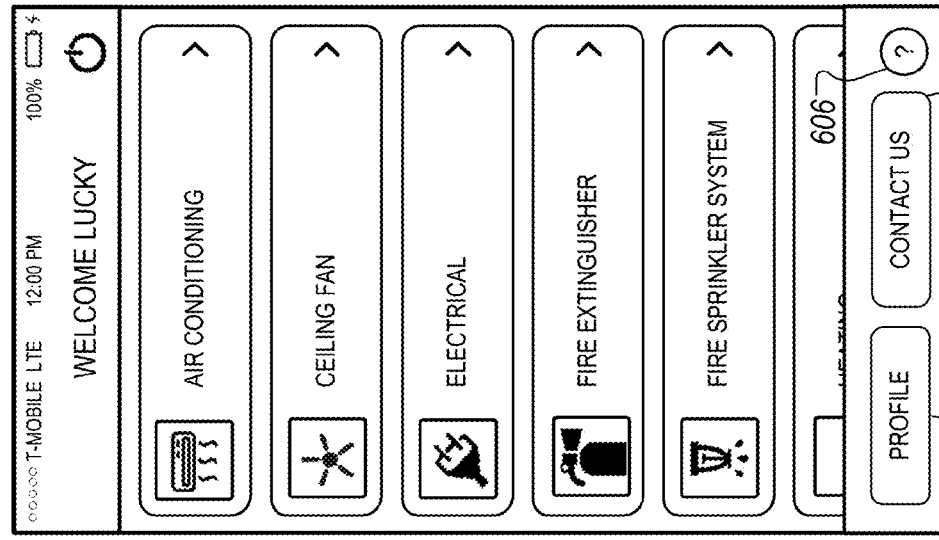

In the screenshot 600a depicted in FIG. 6A, categories of building components/systems that are installed within a user's building are presented to the user. The categories can be specifically selected based on the specific components/systems that are installed within a building that is associated with the user. For example, the categories may broadly cover different categories of components within the building, such as electrical, plumbing, HVAC, fire sprinkler, appliances, and low voltage systems. Such categories may be nested and allow the user to select further subcategories. An example grouping of categories and subcategories is provided below in Table 1.

TABLE 1

| Category | Sub-Categories |
| --- | --- |
| Landscaping | Trees |
|  | Sod |
|  | Irrigation System |
| Paving - driveway |  |
| Concrete | Exterior concrete - sidewalks and garage slab |
|  | Interior - foundation and basement slab |
| Masonry |  |
| Wood Framing |  |
| Millwork |  |
| Cabinets |  |
| Finish Carpentry |  |
| Roofing |  |
| Caulking |  |
| Insulation |  |
| Siding |  |
| Garage Doors |  |
| Entry Doors |  |
| Windows |  |
| Doors and Hardware |  |
| Gypsum Board | Cracks |
|  | Acoustical Textures |
| Tile |  |
| Flooring | Wood Flooring |
|  | Resilient Flooring |
|  | Carpet |
| Paint |  |
| Shower Door and Bathroom Accessories |  |
| Fireplace |  |
| Kitchen Appliances | Garbage Disposal |
|  | Stove |
|  | Refrigerator |
|  | Dishwasher |
|  | Microwave |
|  | Kitchen hood |
|  | Washer |
|  | Dryer |
| Plumbing | Faucet sets - bathroom, kitchen |
|  | Toilets |
|  | Hot water heater |
|  | Sinks |
|  | Interior sewer |
|  | Water lines |
|  | Hose bibbs |
|  | Sump pump |
| Fire Sprinkler System |  |
| HVAC | Furnace |
|  | HRV |
|  | Air to Air Exchanger |
|  | Bath Fans |
|  | A/C |

TABLE 1-continued

| Category | Sub-Categories |
| --- | --- |
|  | Grilles and registers |
|  | Thermostat |
| Low Voltage | Security System |
|  | Home Theater System |
|  | Cable/TV Hook-Ups |
| Electrical | Light fixtures |
|  | Outlets |
|  | Wall switches |
|  | Door bell |
|  | Exterior outlets |
|  | Exterior light fixtures |

In some implementations, each of the categories of building components/systems that are installed within a user's building can be represented by a different selectable button. In the screenshot 600a, for example, the user can select between air conditioning, ceiling fan, electrical, fire extinguisher, fire sprinkler system, heating, as well as others that can be selected through scrolling down, but which are not depicted in the screenshot. The screenshot 600a further depicts a profile option 602, a contact option 604, and a help option 606. The user can select the profile option 602 to review and modify information about his/her account, such as the user's contact information, associated buildings, and billing information. The user can select the contact option 604 to contact a representative of the system, to register an emergency with the system and/or to place a call with an emergency response system (e.g. 911 system). The help option 606 can be selected to obtain further annotation about how to use the interface depicted in the screenshot 600a. In response to the user selecting the fire sprinkler system option (e.g., touch-based selection of the fire sprinkler system button, voice-based input selecting the fire sprinkler system option), user interfaces providing information about the specific fire sprinkler system that is installed in the building, its component parts, and warranty coverage can be presented, as depicted in FIGS. 6B-D.

As depicted in the screenshot 600b of FIG. 6B, for example, buttons representing component parts of the fire sprinkler system are shown, including fire sprinklers, smoke detectors, and control panels. In response to the user selecting a component (e.g., touch-based selection of a button representing fire sprinklers, voice-based input selecting the fire sprinkler option), further options can be presented to assist the user with troubleshooting the selected component.

Referring to FIG. 6C, the example screenshot 600c is depicted after the user has selected a component (e.g., the fire sprinkler component), as indicated by an icon 610 associated with the selected component appearing in the upper right corner of the screenshot 600c. Other features are depicted in the screenshot 600c, including a warranty option 612, which the user can select to view warranty information for the selected component; a coverage option 614, which the user can select to view coverage of the selected component; a troubleshoot option 616, which the user can select to troubleshoot a resolution to the issue themselves; and a service call option 618, which the user can select to directly place a service call.

In some implementations, the screenshot 600c may include a question that can be part of a series of questions to assess the issue and to help determine whether the user should place a service call for the issue to be resolved. For example, upon selecting the troubleshoot option 616, the user can be presented with a question (e.g., "Did you replace the battery?") and prompts for input (e.g., yes/no) for resolving issues for the selected component. In response to receiving input from the user in regard to the question, one or more follow-up questions (e.g., "Is the warning indicator on?") or possible solutions (e.g., "Replace the battery by removing the front panel.") for resolving issues can be provided.

Referring to FIG. 6D, the example screenshot 600d is depicted after the user has selected the warranty option 612. For example, the user can be provided with information about the current warranty coverage (e.g., warranty coverage set to expire on Oct. 15, 2015) for the selected component. In some implementations, selectable options may be provided to renew the warranty coverage through the application. Referring to the screenshot 600d, for example, the user can "click here" to extend warranty service, or can elect to delay renewal.

In response to selection of the service call option 618 in FIG. 6C, the user can be presented with a user interface through which the user can triage the issue with the selected component (e.g., fire sprinkler), as depicted in the screenshots 600e-h of FIGS. 6E-H. For instance, as depicted in the screenshot 600e of FIG. 6E, the user is provided with selectable features 620 to identify the issue that is being experienced with the fire sprinkler. The features 620 that are presented in FIG. 6E can be populated based on a variety of factors, such as the specific components of the fire sprinkler system, historical issues with these components (e.g., issues identified through other service inquiries and/or warranty claims), historical issues associated with fire sprinkler systems installed and/or serviced by one or more contractors who have worked on the user's system (e.g., history of the contractor not properly installing particular components that later fail), and/or other appropriate factors. The screenshot 600e, for example, includes features 620 through which a user can further specify the issues that they are experiencing with the fire sprinkler, an upload image button 622 through which the user can select one or more images to provide that depict the issue with the fire sprinkler, an upload video button 624 through which the user can select one or more videos to provide that depict the issue with the fire sprinkler, a desired appointment button 626 through which the user can designate one or more days and times that would work best for an appointment, and an additional comment button 628 through which the user can provide additional information regarding the issue. Confirmation of appointments can be provided after a service provider confirms a time that will work with his/her schedule, which can be synced through one or more calendar programs, such as MICROSOFT EXCHANGE and GOOGLE CALENDAR.

Figure 6F:
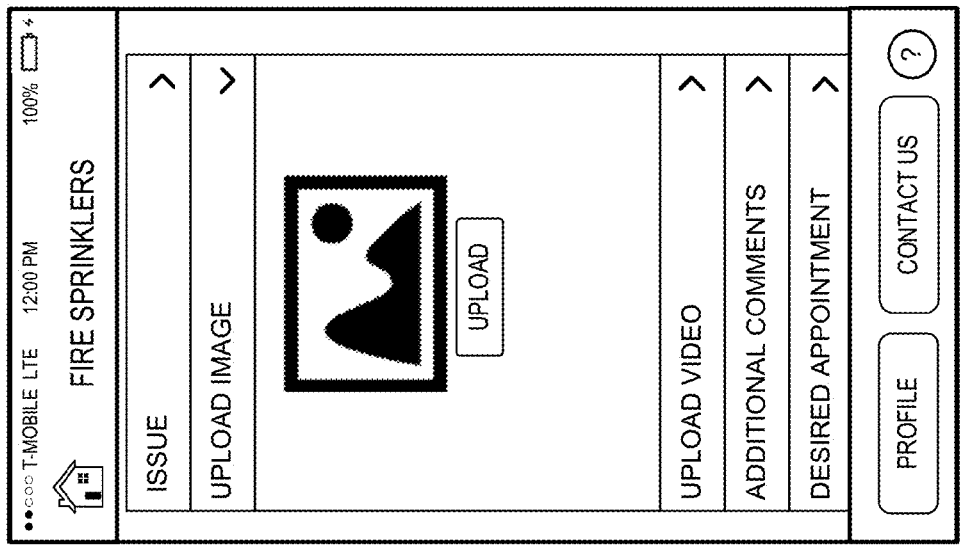
Figure 6E:
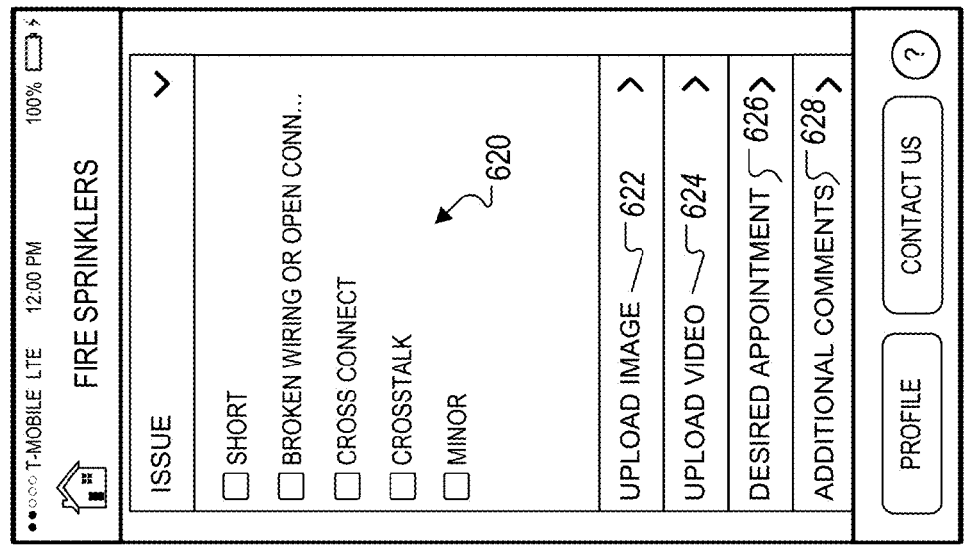
Figure 6D:
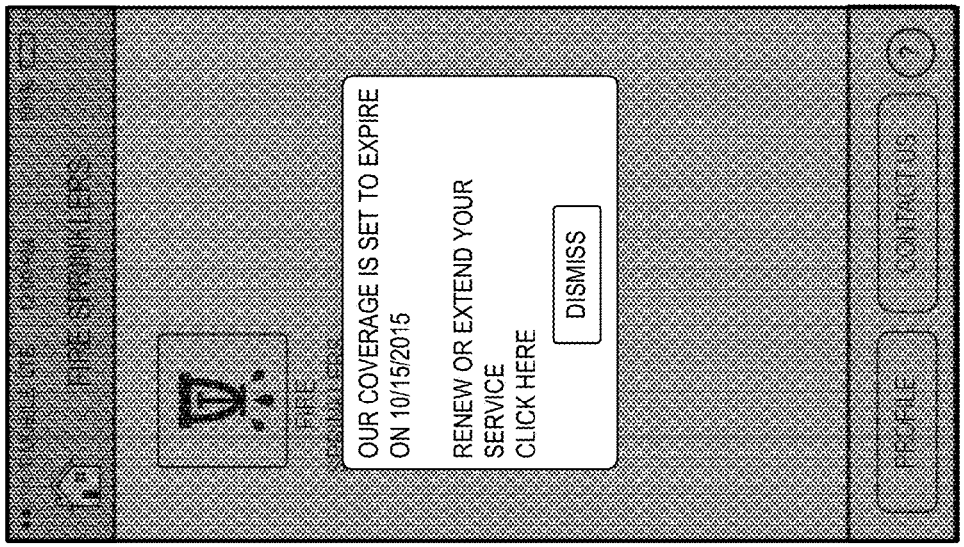

As depicted in the screenshot 600f of FIG. 6F, the user can upload one or more images of the issue, such as by selecting an image from a local or remote file system (e.g., local photo album, remote photo album, email attachment, image transmitted through MMS message) and/or by taking photos using one or more cameras on the device (e.g., front and/or rear facing cameras on a smartphone and/or tablet computing device). Similarly, the user can upload one or more videos that depict the issue, such as through selection of videos from a local or remote file system (e.g., local video repository, remote video repository, email attachment, video transmitted through MMS message) and/or by taking videos using one or more cameras and microphones on the device (e.g., front/rear facing cameras and embedded microphones that are part of smartphones and/or tablet computing devices).

Figure 6G:
Figure 6H:

As depicted in the screenshot 600g of FIG. 6G, the user can enter and upload additional comments regarding the issue, and, as depicted in the screenshot 600h of FIG. 6H, the user can select a desired appointment date and/or time for the service call. In some implementations, confirmations/reminders may be provided for a scheduled appointment. For example, such a reminder can be provided at a predetermined amount of time before the appointment, such as 1 week before, 3 days before, 1 day before, 6 hours before, 2 hours before, 1 hour before, and/or other predetermined time periods.

In some implementations, the example mobile application that can be used to address building issues may include an interface through a user can login to the system (e.g., computer system 102, computer system 302) from a mobile computing device. For example, the user can enter a username and password. Other possible ways of authenticating a user on the mobile computing device, such as a smartphone, are also possible, such as fingerprint verification, facial recognition, voice recognition, retinal scans, biometric verification, and/or other appropriate login mechanisms.

In some implementations, the example mobile application that can be used to address building issues may include an interface through which the user can provide his/her signature to verify that the work has been completed, and through which the user can review and/or rate the work performed by the contractor/developer. For example, the interface may be presented on the user's mobile computing device after the contractor/developer has sent a confirmation to the system (e.g., system 102, system 302) that the work has been completed through their own computing device.

Other features can also be provided through the interfaces depicted in the screenshots 600a-h, such as an area in which a user can be notified of recalls on the specific components that are installed in one or more of the user's buildings. For example, a tab or button could be provided in the interface depicted in screenshot 600c in which a user can be notified of a number of components that currently have outstanding recall notices, which may originate from any of a variety of parties (e.g., manufacturers, service providers, warranty providers, insurers). A backend computer system, such as the computer systems 102, 302, and/or 406, can identify and notify users of such recalls. For example, such backend computer systems can receive and/or obtain information about component recalls (e.g., monitor recall notices provided by manufacturers, receive notification from manufacturers), can compare recall information (e.g., component make and model number, serial number) to component information for buildings, can identify components that are subject to one or more recalls, and can push/send notifications of such recalls to users. Such notifications can include any of a variety of appropriate details, such as information identifying the specific components that is being recalled, the reason for the recall, any danger/risk that may be posed by the component until it is replaced/repaired, and/or steps that the user should take to mitigate such danger/risk. The notification can also provide the user with an option to schedule a service call to address the recall, similar to the processes described above with regard to automating service requests.

Although not explicitly described or depicted above with regard to FIGS. 1-4, the computer systems 102, 302, and/or 406 can additionally be programmed to process payments for things that are authorized by end users, such as payment authorizations provided by the building owner 110 through the computing device 124, payment authorizations provided by the other party 112 through the computing device 142, authorizations provided through the computing devices 304-306, 402, 404, and 408, and authorizations provided through the interfaces depicted in the screenshots 500*a-q* and 600*a-h*. The computer systems 102, 302, and/or 402 may include one or more ecommerce modules that are configured to process electronic payments, such as credit card payments, electronic funds transfers (EFTs), and/or other electronic payments (e.g., APPLE PAY). The computer systems 102, 302, and/or 402 may also be configured to process payments through communication with one or more third-party electronic payment processing systems, such as those provided by PAYPAL, SQUARE, and APPLE PAY.

For example, in response to user selection of an option to renew a warranty that will expire shortly, the mobile computing device that is depicted in screenshot 600*d* can send the payment authorization to a corresponding backend computer system (e.g., the computer systems 102, 302, and 402), which can process the electronic payment and, once the electronic payment has been successfully made, can renew/extend the period of the warranty. Such electronic payments can be made from client devices for any of a variety of other services as well, such as purchasing products (e.g., components, consumer products), services (e.g., paying for repair services that may not be covered by insurance or warranties), and/or paying for a subscription to use the services of the computer system (e.g., renewing a subscription with the computer systems 102, 302, and 402).

Figure 7:
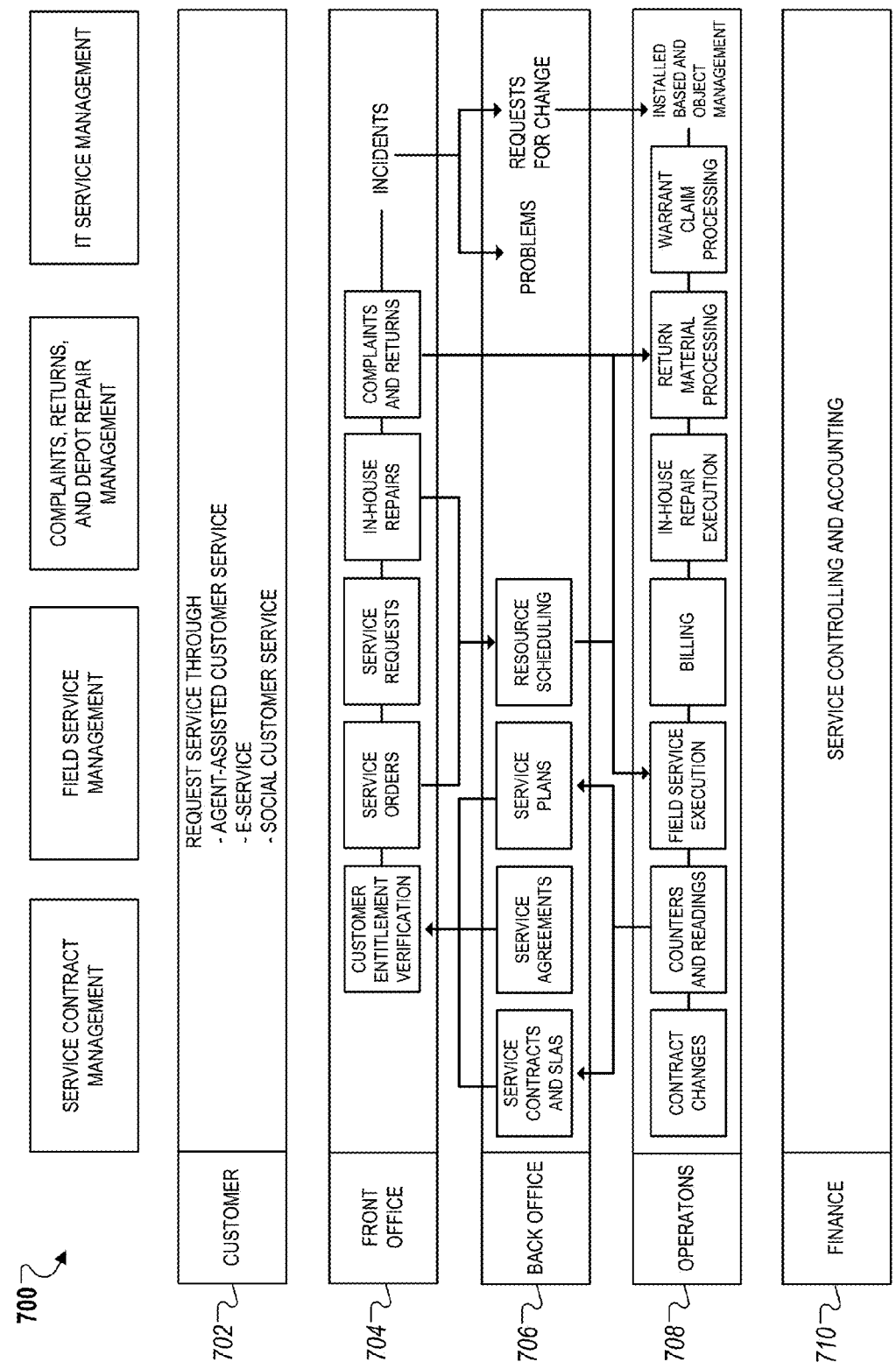
FIG. 7 is a diagram of an example workflow for an entity with multiple different departments that are used by the entity to schedule and provide services to customers.

FIG. 7 is a diagram of an example workflow 700 for an entity with multiple different departments that are used by the entity to schedule and provide services to customers. The operations that are part of the example workflow 700 are depicted as being performed by a customer 702, a front office 704, a back office 706, operations 708, and finance 710. The front office 704, the back office 706, the operations 708, and finance 710 can all be different departments/groups/roles within an organization, such as a contractor/builder/service provider.

The operations that are performed by the customer 702 can be performed on a computing device that is associated with the customer 702, such as the computing device 124, the computing device 304, and/or the mobile computing device that is depicted in FIGS. 6A-H.

The operations that are performed across 704-710 can all be performed on the same computing device or across multiple different computing devices, which may each have separate application (e.g., mobile apps, desktop applications) with specific functionality needed for each role. For example, the operations of the front office 704 can be performed by salesmen and customer service representatives using specifically designed applications to perform the operations listed for the front office 704, such as creating service requests that will be fulfilled by operations 708. Operations 708 can use an application, which may be the same as or different from the application for the front office 704, to direct their execution of service requests and other associated tasks. The back office 706 can be responsible overseeing and managing both the front office 704 and the operations 708, and can use applications (same or different from applications used by the front office 704 and operations 708) to perform scheduling and service agreement operations. The finance 710 can additionally use an application (same or different from the applications used by others) to manage money flow and accounting within the entity.

The applications that are used by 704-710 can be run on any of a variety of appropriate computing devices, such as computing devices 142, 306, 308, and/or the computing device depicted in FIGS. 5A-Q.

Figure 8:
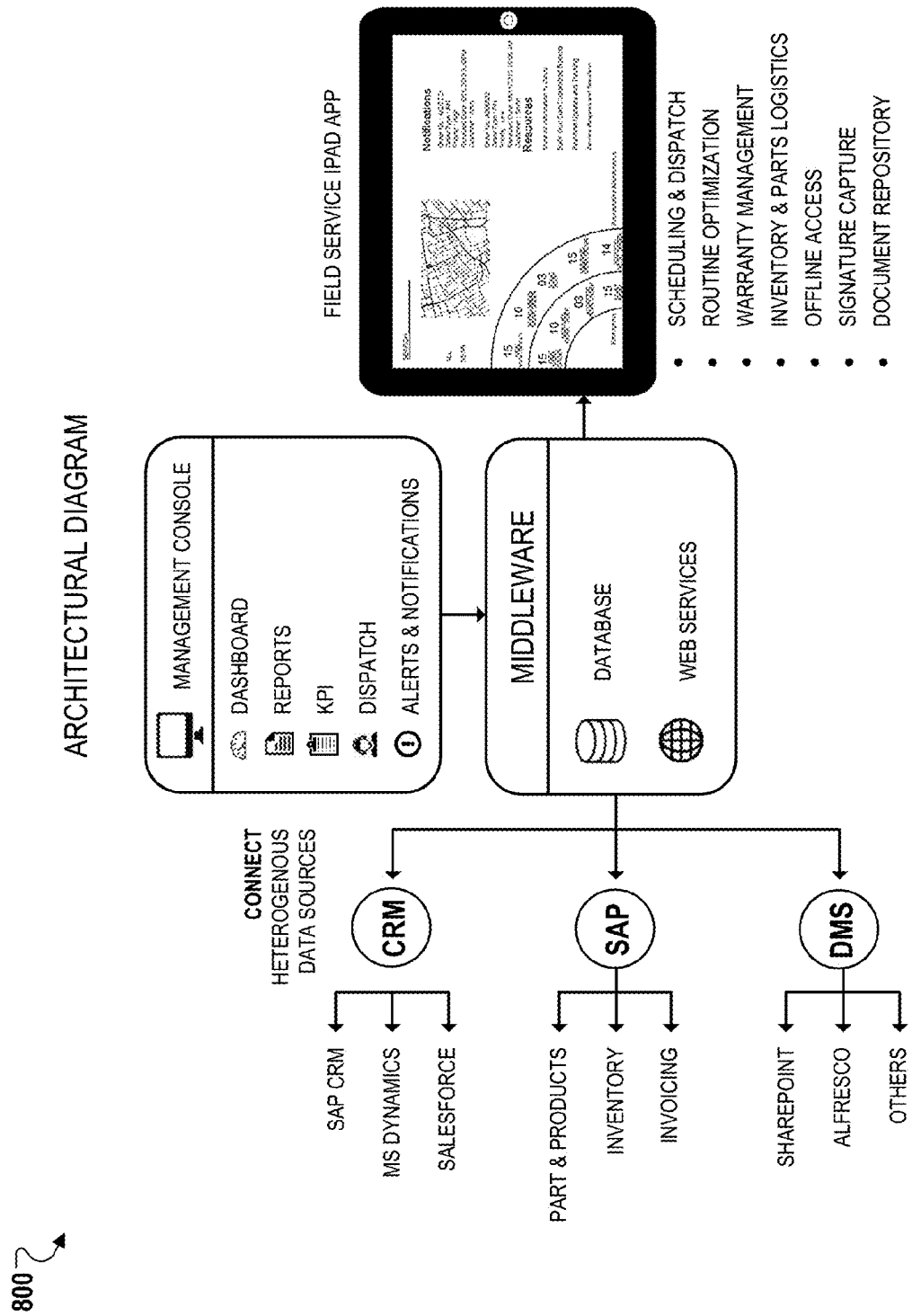
FIG. 8 is an architectural diagram of a mobile application and supporting backend system for field service providers, such as builders, contractors, vendors, and other service providers.

FIG. 8 is an architectural diagram 800 of a mobile application and supporting backend system for field service providers, such as builders, contractors, vendors, and other service providers.

The mobile application (e.g., IPAD app) depicted in the diagram 800 can provide a variety of features that are used by field service providers, such as scheduling and dispatch of workers (e.g., field service providers), route optimization for workers responding to service requests, warranty management, inventory and parts logistics for components that are used in service requests and new installations, offline access to all resources, and a document repository (e.g., work orders, training documents). The mobile application can be provided on any of a variety of appropriate computing devices, such as the computing devices 142, 306, 308, and/or the computing device depicted in FIGS. 5A-Q.

The supporting backend system can include a middleware layer that provides database support and web services that are used by the mobile application, such as services that are provided through one or more appropriate data sources (e.g., customer resource management (CRM) systems, SAP systems, DMS systems). The backend system can additionally include a management console through which information about the performance and state of the backend system can be viewed. The supporting backend system can be provided by any of a variety of appropriate computer systems, such as the computer systems 102 and 302.

The technology described above can additionally or alternatively include one or more of the following features. Data that is obtained from service requests can be used to provide useful analytics to a variety of parties, such as builders, contractors, manufacturers, warranty providers, and insurers. For example, builders would be interested in finding out what components work well and raise few issues for home owners, and what components do not work well and raise many issues for home owners. In the aggregate, the data points collected from service requests can provide a builder with insight into the specific components that they install in homes, as well as a broader view of components installed by other builders. For instance, from such analytics a builder may learn that a particular component frequently causes issues for homeowners, but that a competitor component that is installed by other builders and that provides the same functionality has a much lower rate of incident. This may prompt the builder to switch to using the competitor component. In another instance, a builder may learn that for a particular component the builder has a greater rate of incident than other builders installing the same component. This may prompt the builder to check that the component is being installed properly by the builder's workers and that the homeowners are being properly education on how to use and maintain the component.

In another example, data points collected from service requests can provide manufacturers with greater levels of detail as to when and in what situations their products are either malfunctioning or are causing homeowners to incorrectly believe that they are malfunctioning. Such insight can help manufacturers improve product designs and educational material to avoid such instances.

In a further example, warranty providers and insurers can obtain greater insight into costs and probabilities of malfunction with particular components. Such insight may allow warranty providers and insurers to more appropriately price policies based on factors related to component installation, such as the climate where the component is being installed, the identity of workers who are installing the components, and/or other relevant factors.

Such analytics information can be provided using any of a variety of appropriate techniques to ensure accuracy of the data and, where appropriate, anonymity of the parties involved in the specific instances that are aggregated together. Analytics information can be licensed under any of a variety of pricing structures, such as subscription-bases.

In another example, the mobile apps and webpages that are described as being provided for building owners (e.g. homeowners) can include maintenance checklists for users to perform on the specific components that are installed in their building. Such checklists can track when maintenance is performed and information about such maintenance can be logged in association with the building. The checklists feature can provide the user with reminders about upcoming maintenance, instructions as to how to perform the maintenance, and features through which users can submit a service request for a professional to perform the maintenance. Incentives may be tied to performance of one or more maintenance items on the checklist, such as lower warranty renewal rates when suggested maintenance is performed on a component according to the suggested maintenance schedule.

In a further example, the technology disclosed above may communicate with and obtain information directly from components within a building. For instance, many components in a building, such as thermostats, appliances, and light fixtures, are capable of communicating and providing status information over one or more communication networks, such as Wi-Fi. The disclosed technology can allow for a user's computing device to be in communication with such components in the user's building and can flag potential issues for the user automatically when a possible malfunction has been detected. In some instances, a user may be required to verify and/or consent to a service request being sent out to a computer system (e.g., the computer system 102, the computer system 302). In other instance, a user's computing device may automatically transmit a service request to a computer system when any issue or issues with at least a threshold level of severity are detected.

Computing devices and computer systems described in this document that may be used to implement the systems, techniques, machines, and/or apparatuses can operate as clients and/or servers, and can include one or more of a variety of appropriate computing devices, such as laptops, desktops, workstations, servers, blade servers, mainframes, mobile computing devices (e.g., PDAs, cellular telephones, smartphones, and/or other similar computing devices), computer storage devices (e.g., Universal Serial Bus (USB) flash drives, RFID storage devices, solid state hard drives, hard-disc storage devices), and/or other similar computing devices. For example, USB flash drives may store operating systems and other applications, and can include input/output components, such as wireless transmitters and/or USB connector that may be inserted into a USB port of another computing device.

Such computing devices may include one or more of the following components: processors, memory (e.g., random access memory (RAM) and/or other forms of volatile memory), storage devices (e.g., solid-state hard drive, hard disc drive, and/or other forms of non-volatile memory), high-speed interfaces connecting various components to each other (e.g., connecting one or more processors to memory and/or to high-speed expansion ports), and/or low speed interfaces connecting various components to each other (e.g., connecting one or more processors to a low speed bus and/or storage devices). Such components can be interconnected using various busses, and may be mounted across one or more motherboards that are communicatively connected to each other, or in other appropriate manners. In some implementations, computing devices can include pluralities of the components listed above, including a plurality of processors, a plurality of memories, a plurality of types of memories, a plurality of storage devices, and/or a plurality of buses. A plurality of computing devices can be connected to each other and can coordinate at least a portion of their computing resources to perform one or more operations, such as providing a multi-processor computer system, a computer server system, and/or a cloud-based computer system.

Processors can process instructions for execution within computing devices, including instructions stored in memory and/or on storage devices. Such processing of instructions can cause various operations to be performed, including causing visual, audible, and/or haptic information to be output by one or more input/output devices, such as a display that is configured to output graphical information, such as a graphical user interface (GUI). Processors can be implemented as a chipset of chips that include separate and/or multiple analog and digital processors. Processors may be implemented using any of a number of architectures, such as a CISC (Complex Instruction Set Computers) processor architecture, a RISC (Reduced Instruction Set Computer) processor architecture, and/or a MISC (Minimal Instruction Set Computer) processor architecture. Processors may provide, for example, coordination of other components computing devices, such as control of user interfaces, applications that are run by the devices, and wireless communication by the devices.

Memory can store information within computing devices, including instructions to be executed by one or more processors. Memory can include a volatile memory unit or units, such as synchronous RAM (e.g., double data rate synchronous dynamic random access memory (DDR SDRAM), DDR2 SDRAM, DDR3 SDRAM, DDR4 SDRAM), asynchronous RAM (e.g., fast page mode dynamic RAM (FPM DRAM), extended data out DRAM (EDO DRAM)), graphics RAM (e.g., graphics DDR4 (GDDR4), GDDR5). In some implementations, memory can include a non-volatile memory unit or units (e.g., flash memory). Memory can also be another form of computer-readable medium, such as magnetic and/or optical disks.

Storage devices can be capable of providing mass storage for computing devices and can include a computer-readable medium, such as a floppy disk device, a hard disk device, an optical disk device, a Microdrive, or a tape device, a flash memory or other similar solid state memory device, or an array of devices, including devices in a storage area network or other configurations. Computer program products can be tangibly embodied in an information carrier, such as memory, storage devices, cache memory within a processor, and/or other appropriate computer-readable medium. Computer program products may also contain instructions that, when executed by one or more computing devices, perform one or more methods or techniques, such as those described above.

High speed controllers can manage bandwidth-intensive operations for computing devices, while the low speed controllers can manage lower bandwidth-intensive operations. Such allocation of functions is exemplary only. In some implementations, a high-speed controller is coupled to memory, display 616 (e.g., through a graphics processor or accelerator), and to high-speed expansion ports, which may accept various expansion cards; and a low-speed controller is coupled to one or more storage devices and low-speed expansion ports, which may include various communication ports (e.g., USB, Bluetooth, Ethernet, wireless Ethernet) that may be coupled to one or more input/output devices, such as keyboards, pointing devices (e.g., mouse, touchpad, track ball), printers, scanners, copiers, digital cameras, microphones, displays, haptic devices, and/or networking devices such as switches and/or routers (e.g., through a network adapter).

Displays may include any of a variety of appropriate display devices, such as TFT (Thin-Film-Transistor Liquid Crystal Display) displays, OLED (Organic Light Emitting Diode) displays, touchscreen devices, presence sensing display devices, and/or other appropriate display technology. Displays can be coupled to appropriate circuitry for driving the displays to output graphical and other information to a user.

Expansion memory may also be provided and connected to computing devices through one or more expansion interfaces, which may include, for example, a SIMM (Single In Line Memory Module) card interfaces. Such expansion memory may provide extra storage space for computing devices and/or may store applications or other information that is accessible by computing devices. For example, expansion memory may include instructions to carry out and/or supplement the techniques described above, and/or may include secure information (e.g., expansion memory may include a security module and may be programmed with instructions that permit secure use on a computing device).

Computing devices may communicate wirelessly through one or more communication interfaces, which may include digital signal processing circuitry when appropriate. Communication interfaces may provide for communications under various modes or protocols, such as GSM voice calls, messaging protocols (e.g., SMS, EMS, or MMS messaging), CDMA, TDMA, PDC, WCDMA, CDMA2000, GPRS, 4G protocols (e.g., 4G LTE), and/or other appropriate protocols. Such communication may occur, for example, through one or more radio-frequency transceivers. In addition, shortrange communication may occur, such as using a Bluetooth, Wi-Fi, or other such transceivers. In addition, a GPS (Global Positioning System) receiver module may provide additional navigation- and location-related wireless data to computing devices, which may be used as appropriate by applications running on computing devices.

Computing devices may also communicate audibly using one or more audio codecs, which may receive spoken information from a user and convert it to usable digital information. Such audio codecs may additionally generate audible sound for a user, such as through one or more speakers that are part of or connected to a computing device. Such sound may include sound from voice telephone calls, may include recorded sound (e.g., voice messages, music files, etc.), and may also include sound generated by applications operating on computing devices.

Various implementations of the systems, devices, and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, or code) can include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor.

To provide for interaction with a user, the systems and techniques described here can be implemented on a computer having a display device (e.g., LCD display screen, LED display screen) for displaying information to users, a keyboard, and a pointing device (e.g., a mouse, a trackball, touchscreen) by which the user can provide input to the computer. Other kinds of devices can be used to provide for interaction with a user as well; for example, feedback provided to the user can be any form of sensory feedback (e.g., visual feedback, auditory feedback, and/or tactile feedback); and input from the user can be received in any form, including acoustic, speech, and/or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

The above description provides examples of some implementations. Other implementations that are not explicitly described above are also possible, such as implementations based on modifications and/or variations of the features described above. For example, the techniques described above may be implemented in different orders, with the inclusion of one or more additional steps, and/or with the exclusion of one or more of the identified steps. Additionally, the steps and techniques described above as being performed by some computing devices and/or systems may alternatively, or additionally, be performed by other computing devices and/or systems that are described above or other computing devices and/or systems that are not explicitly described. Similarly, the systems, devices, and apparatuses may include one or more additional features, may exclude one or more of the identified features, and/or include the identified features combined in a different way than presented above. Features that are described as singular may be implemented as a plurality of such features. Likewise, features that are described as a plurality may be implemented as singular instances of such features. The drawings are intended to be illustrative and may not precisely depict some implementations. Variations in sizing, placement, shapes, angles, and/or the positioning of features relative to each other are possible.

What is claimed is:

1. A computer-implemented method comprising:
    receiving, at a computer system and over the internet from a client computing device, information that describes an issue with a building, wherein the information includes first information corresponding to the issue and second information identifying the building or a user associated with the building, the first information including, at least, (i) a digital image or video taken by the client computing device that visually depicts the issue and (ii) detected location information that identifies a location within the building at which the client computing device captured the digital image or video;
    accessing, by the computer system and based on the second information identifying the building or the user associated with the building, data that identifies (i) a plurality of components that are included in the building and (ii) features of the plurality of components, wherein the plurality of components are a subset of all components contained within a database of building components, and the data includes (i) component digital images that depict the plurality of components and (ii) component location information that identifies locations within the building where the plurality of components are installed;
    identifying, by the computer system and based on a comparison of the first information with the data for the building, one or more candidate components that have at least a threshold likelihood of being, at least partially, a cause of the issue, wherein the identifying comprises:
        determining, by the computer system, visual matching scores for each of the plurality of components based on comparisons of the digital image or video taken by the client computing device with the component digital images;
        determining, by the computer system, location matching scores for each of the plurality of components based on comparisons of the detected location information with the component location information; and
        selecting, by the computer system, the one or more candidate components from among the plurality of components based on one or more of the visual matching scores and the location matching scores;
    selecting, by the computer system, a candidate service provider from among a plurality of service providers based on a comparison of (i) the one or more candidate components and (ii) information identifying technical qualifications for the plurality of service providers;
    transmitting, by the computer system, a service request for the issue to the candidate service provider;
    receiving, at the computer system, a response from the candidate service provider; and
    scheduling, by the computer system and based on the response, a service appointment with the candidate service provider to resolve the issue.

2. The computer-implemented method of claim 1, wherein:
    the service request includes information identifying the one or more candidate components, and
    the response from the candidate service provider indicates that the one or more candidate components are currently accessible to the candidate service provider for the service appointment.

3. The computer-implemented method of claim 1, wherein:
    the service request includes information identifying a timeframe for resolving the issue, and
    the response from the candidate service provider indicates that the candidate service provider is currently able to resolve the issue within the timeframe.

4. The computer-implemented method of claim 3, further comprising:
    determining a level of urgency of the issue based on the information received from the client computing device; and
    determining the timeframe based, at least in part, on the level of urgency.

5. The computer-implemented method of claim 1, wherein the candidate service provider is selected based, at least in part, on the candidate service provider either providing a warranty associated with the one or more candidate components or being preapproved by a warranty provider for the one or more candidate components to service the issue.

6. The computer-implemented method of claim 1, wherein:
    the candidate service provider is selected using a bidding process for the service request involving a plurality of candidate service providers, and
    the candidate service provider is selected based, at least in part, on a particular bid that was provided by the candidate service provider for the bidding process.

7. The computer-implemented method of claim 6, wherein the bid provided by the candidate service provider provided a lowest price for servicing the issue from among all bids received in the bidding process.

8. The computer-implemented method of claim 6, wherein the bid provided by the candidate service provider provided a shortest guaranteed timeframe for servicing the issue from among all bids received in the bidding process.

9. The computer-implemented method of claim 6, wherein the bid provided by the candidate service provider provided a fastest guaranteed response time for servicing the issue from among all bids received in the bidding process.

10. The computer-implemented method of claim 1, wherein the digital image or video comprises: one or more photographs taken of the issue by the client computing device.

11. The computer-implemented method of claim 1, wherein the identifying further comprises:
    transmitting, by the computer system and over the internet to the client computing device, component information that describes the one or more candidate components to the client computing device, the component information being received and presented in a user interface on the client computing device;
    receiving, at the computer system and over the internet from the client computing device, selection of one or more of the candidate components as being a likely cause of the issue.

12. The computer-implemented method of claim 11, wherein the component information comprises images of the one or more components.

13. The computer-implemented method of claim 11, wherein the component information comprises textual descriptions of where in the building the one or more components are installed.

14. The computer-implemented method of claim 1, further comprising:
determining whether the one or more candidate components are covered under one or more warranties; and
transmitting information about the one or more warranties to the client computing device.

15. The computer-implemented method of claim 14, further comprising:
processing payment for work performed at the service appointment based, at least in party, on the one or more warranties for the one or more candidate components.

16. The computer-implemented method of claim 1, further comprising:
receiving information from the candidate service provider indicating that the issue with the building has been resolved;
transmitting, to the client computing device, a request for confirmation that the issue has been resolved; and
receiving, from the client computing device, confirmation that the issue has been resolved.

17. The computer-implemented method of claim 16, further comprising:
in response to receiving the conformation from the client computing device, processing payment of one or more invoices from the candidate service provider for work performed at the service appointment.

18. A computer program product embodied in a non-transitory computer storage device storing instructions that, when executed, cause one or more computer processors to perform operations comprising:
receiving, over the internet from a client computing device, information that describes an issue with a building, wherein the information includes first information corresponding to the issue and second information identifying the building or a user associated with the building, the first information including, at least, (i) a digital image or video taken by the client computing device that visually depicts the issue and (ii) detected location information that identifies a location within the building at which the client computing device captured the digital image or video;
accessing, based on the second information identifying the building or the user associated with the building, data that identifies (i) a plurality of components that are included in the building and (ii) features of the plurality of components, wherein the plurality of components are a subset of all components contained within a database of building components, and the data includes (i) component digital images that depict the plurality of components and (ii) component location information that identifies locations within the building where the plurality of components are installed;
identifying, based on a comparison of the first information with the data for the building, one or more candidate components that have at least a threshold likelihood of being, at least partially, a cause of the issue, wherein the identifying comprises:
determining visual matching scores for each of the plurality of components based on comparisons of the digital image or video taken by the client computing device with the component digital images;
determining location matching scores for each of the plurality of components based on comparisons of the detected location information with the component location information; and
selecting the one or more candidate components from among the plurality of components based on one or more of the visual matching scores and the location matching scores;
selecting a candidate service provider from among a plurality of service providers based on a comparison of (i) the one or more candidate components and (ii) information identifying technical qualifications for the plurality of service providers;
transmitting a service request for the issue to the candidate service provider;
receiving a response from the candidate service provider; and
scheduling, based on the response, a service appointment with the candidate service provider to resolve the issue.

19. A computer system comprising:
one or more computer processors; and
a memory storage apparatus in data communication with the one or more processors and storing instructions executable by the one or more processors and that upon such execution cause the one or more processors to perform operations comprising:
receiving, over the internet from a client computing device, information that describes an issue with a building, wherein the information includes first information corresponding to the issue and second information identifying the building or a user associated with the building, the first information including, at least, (i) a digital image or video taken by the client computing device that visually depicts the issue and (ii) detected location information that identifies a location within the building at which the client computing device captured the digital image or video;
accessing, based on the second information identifying the building or the user associated with the building, data that identifies (i) a plurality of components that are included in the building and (ii) features of the plurality of components, wherein the plurality of components are a subset of all components contained within a database of building components, and the data includes (i) component digital images that depict the plurality of components and (ii) component location information that identifies locations within the building where the plurality of components are installed;
identifying, based on a comparison of the first information with the data for the building, one or more candidate components that have at least a threshold likelihood of being, at least partially, a cause of the issue, wherein the identifying comprises:
determining visual matching scores for each of the plurality of components based on comparisons of the digital image or video taken by the client computing device with the component digital images;
determining location matching scores for each of the plurality of components based on comparisons of the detected location information with the component location information; and
selecting the one or more candidate components from among the plurality of components based on one or more of the visual matching scores and the location matching scores;
selecting a candidate service provider from among a plurality of service providers based on a comparison of (i) the one or more candidate components and (ii) information identifying technical qualifications for the plurality of service providers;

transmitting a service request for the issue to the candidate service provider;

receiving a response from the candidate service provider; and scheduling, based on the response, a service appointment with the candidate service provider to resolve the issue.

20. The computer system of claim 19, the operations further comprising:

transmitting, over the internet to the client computing device, component information that describes the one or more candidate components to the client computing device, the component information being received and presented in a user interface on the client computing device;

receiving, over the internet from the client computing device, selection of one or more of the candidate components as being a likely cause of the issue.

* * * * *